United States Patent
Yamamoto et al.

(10) Patent No.: US 11,331,721 B2
(45) Date of Patent: May 17, 2022

(54) MAGNETIC MATERIAL AND PROCESS FOR MANUFACTURING SAME

(71) Applicant: National Institute of Advanced Industrial Science and Technology, Tokyo (JP)

(72) Inventors: Shinpei Yamamoto, Nagoya (JP); Nobuyoshi Imaoka, Nagoya (JP); Kimihiro Ozaki, Nagoya (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 192 days.

(21) Appl. No.: 16/488,396

(22) PCT Filed: Feb. 23, 2018

(86) PCT No.: PCT/JP2018/006615
§ 371 (c)(1),
(2) Date: Aug. 23, 2019

(87) PCT Pub. No.: WO2018/155608
PCT Pub. Date: Aug. 30, 2018

(65) Prior Publication Data
US 2019/0375004 A1    Dec. 12, 2019

(30) Foreign Application Priority Data

Feb. 24, 2017  (JP) .............................. JP2017-033327
Nov. 17, 2017  (JP) .............................. JP2017-222157

(51) Int. Cl.
*B22F 1/00*    (2022.01)
*B22F 3/24*    (2006.01)
(Continued)

(52) U.S. Cl.
CPC .......... *B22F 1/0018* (2013.01); *B22F 1/0085* (2013.01); *B22F 9/22* (2013.01);
(Continued)

(58) Field of Classification Search
None
See application file for complete search history.

(56) References Cited

U.S. PATENT DOCUMENTS 5,308,702 A * 5/1994 Furukimi ............ C22C 33/0207
                                                      428/403
6,592,811 B1   7/2003 Saito et al.
(Continued)

FOREIGN PATENT DOCUMENTS

EP    1 568 427 A1    8/2005
EP    2796223 A1    10/2014
(Continued)

OTHER PUBLICATIONS

Bahgat (Journal of Alloys and Compounds, 2008, vol. 466, p. 59-66). (Year: 2008).*
(Continued)

*Primary Examiner* — Xiaowei Su
(74) *Attorney, Agent, or Firm* — Morgan, Lewis & Bockius LLP

(57) ABSTRACT

Provided are a new, highly magnetically stable magnetic material which has higher saturation magnetization than ferrite-based magnetic materials, and with which problems of eddy current loss and the like can be solved due to higher electric resistivity than that of existing metal-based magnetic materials, and a method for manufacturing the same. A magnetic material powder is obtained by reducing in hydrogen Ni-ferrite nanoparticies obtained by wet synthesis and causing grain growth, while simultaneously causing nanodispersion of an α-(Fe, Ni) phase and an Ni-enriched phase
(Continued)

by means of a phase dissociation phenomenon due to disproportional reaction. The powder is sintered to obtain a solid magnetic material.

16 Claims, 4 Drawing Sheets

(51) Int. Cl.
*H01F 1/147* (2006.01)
*B22F 9/22* (2006.01)
*C22C 38/08* (2006.01)

(52) U.S. Cl.
CPC ......... *C22C 38/08* (2013.01); *H01F 1/14741* (2013.01); *B22F 2304/054* (2013.01); *C22C 2202/02* (2013.01)

(56) References Cited

U.S. PATENT DOCUMENTS

| | | | |
|---|---|---|---|
| 2003/0048582 | A1 | 3/2003 | Kanada et al. |
| 2004/0238796 | A1 | 12/2004 | Abe |
| 2005/0181202 | A1 | 8/2005 | Kaneko et al. |
| 2010/0261038 | A1 | 10/2010 | Imaoka et al. |
| 2019/0051436 | A1 | 2/2019 | Imaoka et al. |
| 2019/0105708 | A1 | 4/2019 | Imaoka et al. |

FOREIGN PATENT DOCUMENTS

| | | |
|---|---|---|
| JP | 2001-176724 A | 6/2001 |
| JP | 2003-077723 A | 3/2003 |
| JP | 2006-097123 A | 4/2006 |
| JP | 2012-197474 A | 10/2012 |
| WO | 2003/015109 A1 | 2/2003 |
| WO | 2009/057742 A1 | 5/2009 |
| WO | 2017/164375 A1 | 9/2017 |
| WO | 2017/164376 A1 | 9/2017 |

OTHER PUBLICATIONS

Hao (Matellurgical Transactions A, 1984, vol. 15A, p. 1819-1827). (Year: 1984).*
Pande (Ironmaking and Steelmaking, Publication date: Oct. 2010, vol. 37 pp. 502-511). (Year: 2010).*
Jin et al., "High-Remanence Square-Loop Fe—Ni and Fe—Mn Magnetic Alloys", IEEE Transactions on Magnetics, vol. Mag-16, No. 5, pp. 1062-1064, Sep. 1980.
Herzer, "Grain Size Dependence of Coercivity and Permeability in Nanocrystalline Ferromagnets", IEEE Transactions on Magnetics, vol. 26, No. 5, pp. 1397-1402, Sep. 1990.
Zhang et al. "Sintered powder cores of high B s and low coreloss Fe84.3Si4B8P3Cu0.7 nano-crystalline alloy", AIP Advances 3, 062118 (2013).
Imaoka et al., "High electrical resistance composite magnets of Sm 2 Fe 17 N 3 powders coated with ferrite layer for high frequency applications", Journal of Applied Physics 103, 07E129 (2008).
Abe, "Ferrite-Film Formation from an Aqueous Solution, and Its Applications", Journal of Magnetics Society of Japan, vol. 22, No. 9, pp. 1225-1232 (1998) with partial translation.
International Search Report dated May 29, 2018, issued in corresponding International Patent Application No. PCT/JP2018/006615.
Extended European Search Report issued in corresponding European Patent Application No. 18757452.0 dated Nov. 11, 2020.
Moghimi et al., "Phase-Induced Shape Evolution of FeNi Nanoalloys and Their Air Stability by in-Situ Surface Passivation," The Journal of Physical Chemistry C, 117, 4852-4858 (2013).
Office Action issued in corresponding Chinese Patent Application No. 201880020685.2 dated Aug. 20, 2020.

* cited by examiner

MAGNETIC MATERIAL AND PROCESS FOR MANUFACTURING SAME

TECHNICAL FIELD

The present invention relates to a magnetic material, and in particular a magnetic material exhibiting soft magnetism, and a production method thereof.

BACKGROUND ART

Global environmental problems, such as global warming and exhaustion of resources, are becoming more severe, and the social demands for energy saving and using less resources in various electronic and electric devices are increasing day by day. In such a situation, there is a need for further improvement in the performance of soft magnetic materials used in the drive unit of motors and the like and the transformer of voltage-conversion devices. In addition, to solve various problems involved with manufacturing various compact and high-performance information communication devices, increasing calculation processing speeds, increasing recording storage capacity, as well as maintaining environmental sanitation in infrastructure, distribution systems that are becoming ever more complex, and strengthening the security that becomes increasingly diverse, there is a need to improve the electromagnetic properties, reliability, and sensitivity of various soft magnetic materials and semi-hard magnetic materials used for various elements, sensors, and systems.

Demand for next-generation automobiles equipped with large motors driven at high revolutions (hereinafter, this refers to revolution speeds exceeding 400 rpm) such as in electric automobiles, fuel cell automobiles, and hybrid automobiles, is expected to further increase in the future to meet the current calls to deal with environmental and energy problems. Among the various problems to be solved, better performance and lower costs for the soft magnetic material used for the stator in a motor are one of the important issues.

Existing soft magnetic materials used for these applications are broadly divided into two types, namely, metallic magnetic materials and oxide-based magnetic materials.

Examples of the former, namely, metallic magnetic materials, include silicon steel (Fe—Si), which is a Si-containing crystalline material being a typical example of electromagnetic steels, as well as sendust (Fe—Al—Si), which is an intermetallic compound containing Al, electromagnetic soft iron (Fe), which is pure iron having a low carbon content of 0.3% by mass or less and a low impurity content, amorphous alloys such as permalloy, which contains Fe—Ni as a main component, and Metglas (Fe—Si—B), and a group of nanocrystalline soft magnetic materials (whose representative compositions include Fe—Cu—Nb—Si—B, Fe—Si—B—P—Cu, etc.), such as Finemet, which are nanocrystal-amorphous phase-separated materials obtained by precipitating microcrystals by applying an appropriate heat treatment to the amorphous alloy. The term "nano" as used here means a size of 1 nm or more and less than 1 μm. For magnetic materials other than nanocrystalline soft magnetic materials, in terms of reducing coercive force and iron loss, it is important to facilitate movement of the domain walls as a composition that is as uniform as possible. It is noted that nanocrystalline soft magnetic materials are a heterogeneous system that includes a crystalline phase, an amorphous phase, a Cu-enriched phase, and the like, and magnetization reversal is considered to be mainly caused by magnetization rotation.

Examples of the latter, namely, oxide-based magnetic materials, include ferritic magnetic materials such as Mn—Zn ferrite and Ni—Zn ferrite.

Silicon steel has until now been the soft magnetic material that is most widely used in high-performance soft magnetic material applications, and is a high magnetization, low coercive force magnetic material having a saturation magnetization of 1.6 to 2.0 T and a coercive force of 3 to 130 A/m. This material is obtained by adding up to 4% by mass of Si to Fe, which lowers the magnetocrystalline anisotropy and the saturation magnetostriction constant and reduces the coercive force without significantly impairing the large magnetization of Fe. In order to improve the performance of this material, it is necessary to remove foreign substances that hinder the movement of domain walls while increasing the crystal grain size by appropriately combining composition-controlled materials with the appropriate hot and cold rolling and annealing. In addition to non-oriented steel sheets with a random orientation of the crystal grains, grain-oriented steel sheets in which the (100) direction of Fe—Si, which is an easily magnetized direction, is highly oriented in the rolling direction are widely used as a material that further reduces coercive force.

Since this material is a rolled material, it has a thickness of less than about 0.5 mm. Further, since this material is a homogeneous metal material, it has a low electric resistivity of about 0.5 μΩm. Generally, this material is used in large equipment applications by covering the surface of each silicon steel sheet with an insulating film, punching out with a die, and laminating and welding to provide thickness while suppressing eddy current loss that occurs in high-rotation applications, such as next-generation automobiles. Therefore, the costs of the punching and lamination steps, and deterioration of the magnetic properties are serious problems.

A nanocrystalline soft magnetic material such as Fe—Cu—Nb—Si—B is a soft magnetic material having a nanocrystalline structure in which the amorphous grain boundary phases are randomly oriented, the soft magnetic material being obtained by subjecting an alloy which has become amorphous by rapid cooling to a heat treatment at a temperature higher than the crystallization temperature to cause crystal grains of about 10 nm to precipitate in the amorphous phase. The coercive force of this material is extremely low, namely, 0.6 to 6 A/m, and the saturation magnetization is 1.2 to 1.7 T, which is higher than that of an amorphous material. Hence, the market for such materials is expanding at present. This material is a relatively new material that was developed in 1988. The principle behind these magnetic properties is that by making the crystal grain size smaller than the ferromagnetic exchange length (also called the exchange coupling length) and by causing the randomly-oriented main phase, namely, the ferromagnetic phase, to undergo ferromagnetic coupling through an amorphous interface phase, the magnetocrystalline anisotropy is averaged, thereby reducing the coercive force. This mechanism is called a random magnetic anisotropy model, or a random anisotropy model (e.g., see Non Patent Document 1).

However, this material is also produced as a thin ribbon by liquid rapid quenching as is the case with amorphous materials, and thus the thickness of the product is about 0.02 to 0.025 mm, and hence this material has the same problems as amorphous materials in terms of the steps, processability, eddy current loss, and increase in costs. Furthermore, the electric resistivity is small at 1.2μΩm, and a problem with eddy current loss similar to other rolled materials and ribbons has been pointed out.

In order to overcome this, attempts have been made to prepare a bulk molding material by pulverizing the above-mentioned ribbon-shaped nanocrystalline soft magnetic material using. SPS (discharge plasma sintering) (e.g., see Non Patent Document 2). However, the magnetic properties are much worse than for a 0.02 mm ribbon, with a coercive force of 300 A/m and a saturation magnetization of 1 T. At present, there is no good method other than a lamination method for producing products thicker than 0.5 mm.

Among existing soft magnetic materials so far, ferrite oxide materials have the least problems with eddy current loss in high-rotation applications. The electric resistivity of such a material is $10^6$ to $10^{12}$ $\mu\Omega$m, and the material can be easily bulked to 0.5 mm or more by sintering. Further, such a material can also be formed into a molded body free from eddy current loss. Therefore, it is a material suitable for high-rotation, high-frequency applications. In addition, since it is an oxide, this material does not rust and the stability of its magnetic properties is also excellent. However, the coercive force of this material is comparatively high, namely, 2 to 160 A/m, and in particular, the saturation magnetization is small at 0.3 to 0.5 T. Therefore, this material is not suitable for high-performance, high-speed motors for next-generation automobiles, for example.

In general, metallic soft magnetic materials such as silicon steel have a low electric resistance, and suffer from the occurrence of eddy current loss for high-rotation, high-performance motors. Consequently, lamination needs to be carried out in order to solve these problems. This results in serious problems such as the steps becoming complicated, magnetic properties deteriorating due to an insulation treatment before lamination, punching and the like, and increased costs for the steps. On the other hand, oxide-based soft magnetic materials such as ferrite have a large electric resistance and no problems with eddy current loss, but they are unsuitable for high-performance motors for next-generation automobiles because they have a small saturation magnetization of 0.5 T or less. Furthermore, from the perspective of oxidation resistance, oxide-based soft magnetic materials are superior to metallic soft magnetic materials in terms of having a high stability.

The upper limit of the thickness that can be used for the motor in the many non-oriented electromagnetic steel sheets of silicon steel that are produced for high-performance motors for next-generation automobiles using permanent magnets is, as shown in Patent Documents 1 and 2, a sheet thickness of about 0.3 mm. However, since the thickness of the next-generation automotive motor is, for example, 9 cm, when a thin silicon steel sheet having a thickness of 0.3 mm is used, about 300 sheets each have to be insulated and laminated. The steps of insulating, punching, aligning, welding and annealing such a thin sheet are complicated and expensive. In order to make the laminated sheet thickness as thick as possible, it is necessary to increase the electric resistivity of the material.

Thus, there is a need for the emergence of a soft magnetic material having an electric resistance higher than a metallic silicon steel sheet and the like, a saturation magnetization higher than a ferrite magnetic material, and physical properties to compensate for problems caused by having such an electric resistance and saturation magnetization, namely, a soft magnetic material combining both the advantages of the high saturation magnetization of metallic magnetic materials and the small eddy current loss, absence of a lamination step and complicated steps associated therewith, high oxidation resistance, and good magnetic stability of oxide-based magnetic materials.

PRIOR ART DOCUMENTS

Patent Document

[Patent Document 1]
WO 2017/164375 A1
[Patent Document 2]
WO 2017/164376 A1

Non Patent Document

[Non Patent Document 1]
G. Herzer, IEEE Transactions on Magnetics, vol. 26, No. 5 (1990) pp. 1397-1402 [Non Patent Document 2]
Y. Zhang, P. Sharma and A. Makino, AIP Advances, vol. 3, No. 6(2013) 062118

SUMMARY OF INVENTION

Technical Problem

It is an object of the present invention to provide, by using a magnetic material in which an $\alpha$-(Fe,Ni) phase and a Ni-enriched phase are nano-dispersed, a new magnetic material, and a production method thereof, having high magnetic stability, which enables a higher saturation magnetization to be realized than a ferrite magnetic material, and enables the above-mentioned problems such as eddy current loss to be solved due to having a higher electric resistivity than existing metallic magnetic materials.

Further, it is an object of the present invention to provide a powder sintered magnetic material which is capable of producing a molded body having a thickness of 0.5 mm or more, further 1 mm or more, and even 5 mm or more, by simple steps without performing complicated steps such as lamination as well as which can reduce eddy current at the same time.

Solution to Problem

The present inventors extensively studied magnetic materials that simultaneously satisfy two points, namely, having a high magnetization and being able to solve the above-mentioned problem of eddy current loss due to a high electric resistivity, which are contradictory characteristics for conventional magnetic materials, and yet have excellent electromagnetic properties that combine the merits of both metallic magnetic materials and oxide-based magnetic materials which do not require complicated steps such as lamination, as well as have stable magnetic properties even in air. As a result, the present inventors discovered that a magnetic material containing two or more of various crystalline phases, or one kind of crystalline phase and an amorphous phase, can be obtained through disproportionation during a reduction reaction of nickel ferrite (in the present invention, also referred to as "Ni-ferrite"), which is completely different from the conventionally-used uniform homogeneous crystalline and amorphous materials or, among amorphous materials, nanocrystalline soft magnetic materials in which uniform nanocrystals are precipitated, and completed the present invention by controlling the composition, the crystal structure, the crystal grain size, and the powder particle diameter of the magnetic material, establishing a method for producing the magnetic material, and establishing a method for solidifying the magnetic material without laminating.

In order to solve the above problem, there is a need for a magnetic material having a saturation magnetization that is 0.3 T, namely, since the density of the magnetic material of the present invention is close to the density of a metal system, the saturation magnetization needs to be at a level of 30 emu/g or higher when calculated in terms of the density of Fe, and an electric resistivity of 1.5 μΩm or more. In particular, just in terms of a soft magnetic material, the saturation magnetization needs to be preferably 100 emu/g or more, and more preferably 150 emu/g or more.

Specifically, the present invention is as follows.

(1) A soft magnetic or semi-hard magnetic material, comprising a first phase having crystals with a bcc structure containing Fe and Ni and a second phase containing Ni, wherein the Ni content relative to a total content of Fe and Ni contained in the second phase is larger than the Ni content relative to a total content of Fe and Ni contained in the first phase.

(2) The magnetic material according to the above (1), which is soft magnetic.

(3) The magnetic material according to the above (1) or (2), wherein the first phase has a composition represented by a composition formula $Fe_{100-x}Ni_x$ (where x is 0.001≤x≤30 in terms of atomic percentage).

(4) The magnetic material according to any one of the above (1) to (3), wherein when the Ni content of the first phase is taken to be 100 atom %, 0.001 atom % or more and less than 50 atom % of the Ni is substituted with one or more of Co, Zr, Ti, V, Nb, Ta, Cr, Mo, W, Mn, Cu, Zn, and Si.

(5) The magnetic material according to any one of the above (1) to (4), wherein the second phase is a phase having crystals with a bcc structure containing Fe and Ni, and the Ni content contained in the second phase is an amount of 1.1 times or more and $10^5$ times or less and/or 2 atom % or more and 100 atom % or less relative to the Ni content relative to the total content of Fe and Ni contained in the first phase.

(6) The magnetic material according to any one of the above (1) to (5), wherein the second phase comprises a Ni-ferrite phase.

(7) The magnetic material according to any one of the above (1) to (6), wherein the second phase comprises a wustite phase.

(8) The magnetic material according to any one of the above (1) to (7), wherein the first phase or the first and second phases having crystals with a bcc structure containing Fe and Ni have a volume fraction of 5% by volume or more based on the whole magnetic material.

(9) The magnetic material according to the above (6) or (7), comprising 20 atom % or more and 99.998 atom % or less of Fe, 0.001 atom % or more and 50 atom % or less of Ni, and 0.001 atom % or more and 55 atom % or less of O based on the composition of the whole magnetic material.

(10) The magnetic material according to any one of the above (1) to (9), wherein an average crystal grain size of the first phase, the second phase, or the whole magnetic material is 1 nm or more and less than 10 μm.

(11) The magnetic material according to any one of the above (1) to (10), wherein at least the first phase has a bcc phase represented by a composition represented by a composition formula $Fe_{100-x}Ni_x$ (where x is 0.001≤x≤30 in terms of atomic percentage), and wherein the bcc phase has a crystallite size of 1 nm or more and less than 100 nm.

(12) The magnetic material according to any one of the above (1) to (11), having a powder form and an average powder particle diameter of 10 nm or more and 5 mm or less.

(13) The magnetic material according to any one of the above (1) to (12), wherein at least one of the first phase and the second phase is ferromagnetically coupled with an adjacent phase.

(14) The magnetic material according to any one of the above (1) to (13), wherein the first phase and the second phase are continuously bonded to each other directly or via a metal phase or an inorganic phase to form a massive state as the whole magnetic material.

(15) A method for producing the magnetic material according to the above (12) by reducing a nickel ferrite powder having an average powder particle diameter of 1 nm or more and less than 1 μm in a reducing gas containing hydrogen gas at a reduction temperature of 450° C. or more and 1425° C. or less.

(16) A method for producing the magnetic material according to any one of the above (1) to (13) by reducing a nickel ferrite powder having an average powder particle diameter of 1 nm or more and less than 1 μm in a reducing gas containing hydrogen gas, and forming the first phase and the second phase by a disproportionation reaction.

(17) A method for producing the magnetic material according to the above (14) by sintering the magnetic material produced by the method according to the above (15) or (16).

(18) A method for producing a soft magnetic material, comprising performing annealing at least once after the reduction step in the method according to the above (15), or after the reduction step or the formation step in the method according to the above (16), or after the sintering step in the method according to the above (17).

Advantageous Effects of Invention

According to the present invention, there can be provided a magnetic material having a high saturation magnetization and a small eddy current loss, in particular a soft magnetic material that is suitably used even in high rotation motors and the like, and various soft magnetic materials and semi-hard magnetic materials having high oxidation resistance.

According to the present invention, because the magnetic material can be used in the form of a powder material like ferrite, it can easily be produced in bulk by sintering or the like, and hence the present invention can solve problems such as complicated steps like lamination and the like caused by the use of metallic soft magnetic materials known as thin sheets, as well as the high costs involved with such steps.

DESCRIPTION OF EMBODIMENTS

Figure 1:
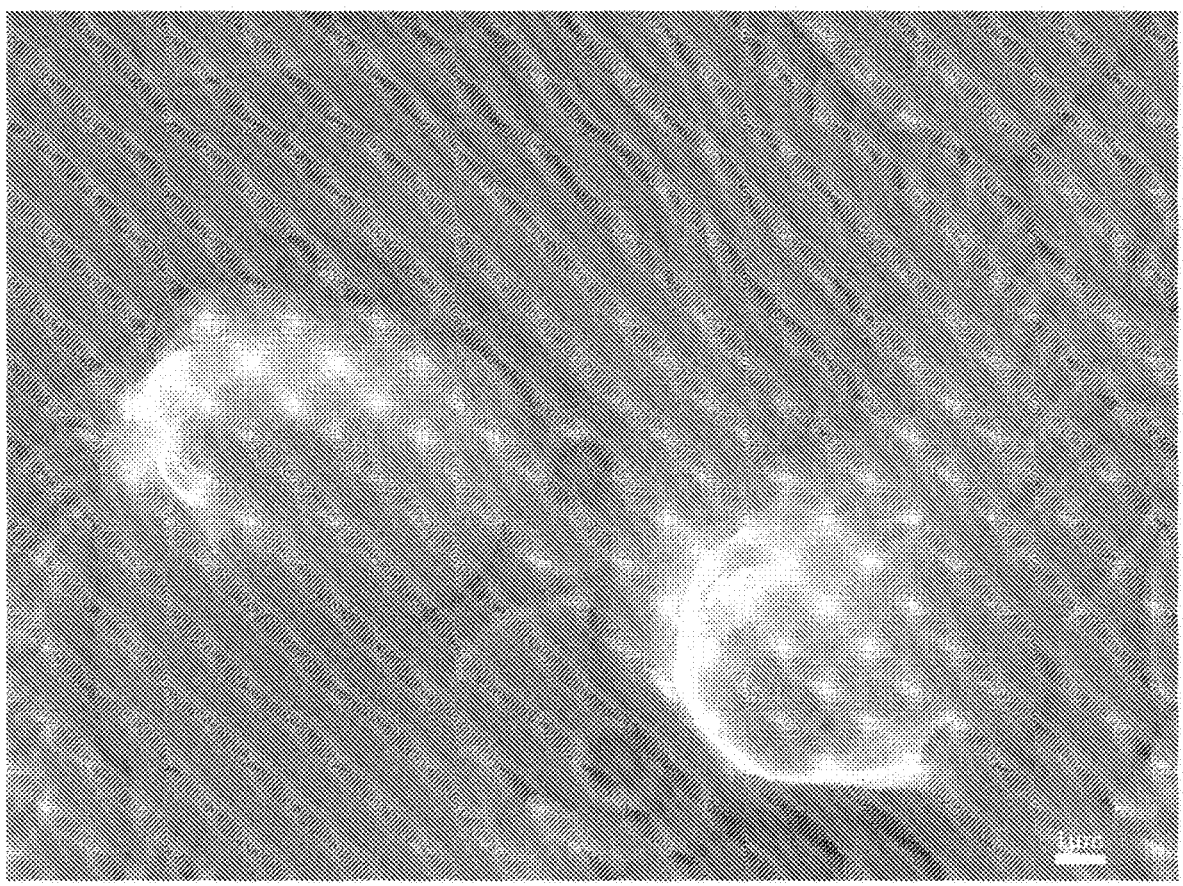
FIG. 1 is an SEM image of a powder (Example 1) obtained by reducing a $(Fe_{0.96}Ni_{0.04})_3O_4$ ferrite nanopowder in hydrogen gas at 1100° C. for 1 hour.
Figure 2:
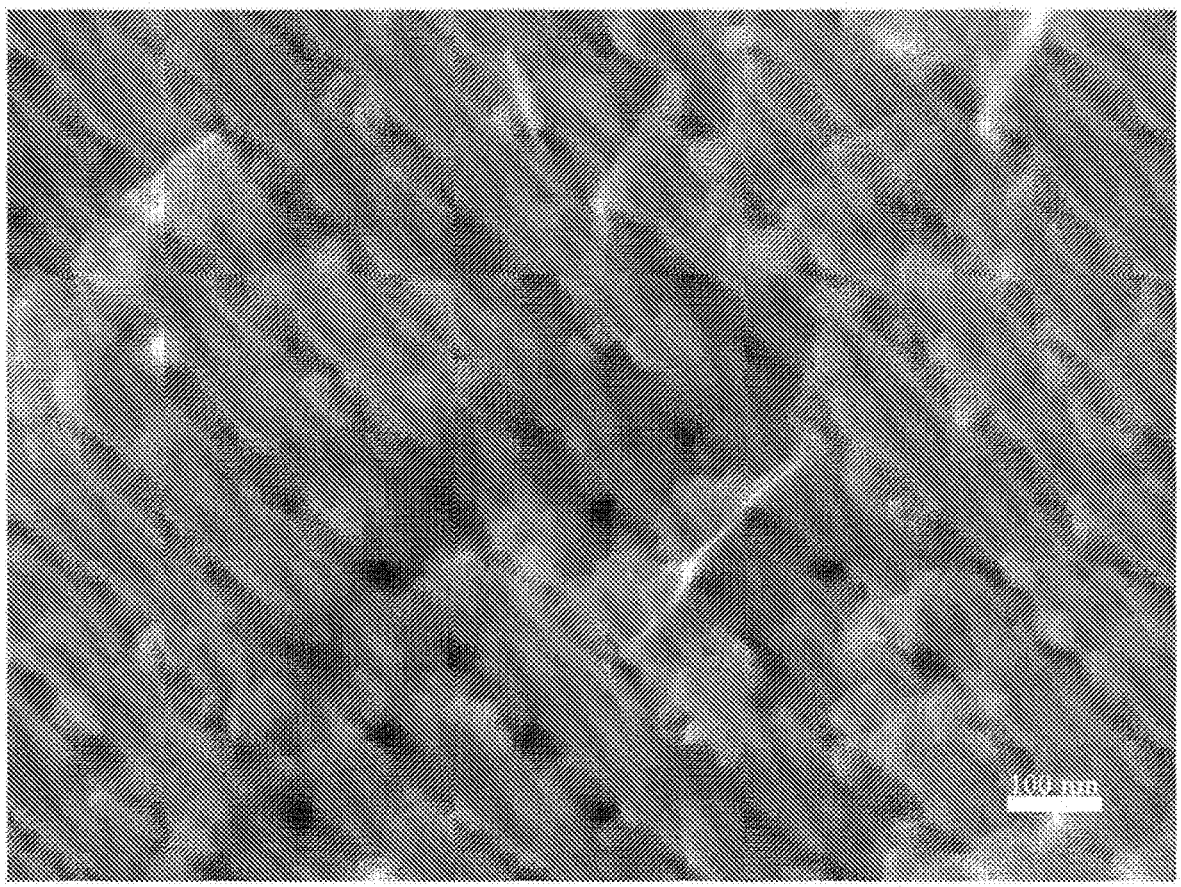
FIG. 2 is an SEM image of a $(Fe_{0.96}Ni_{0.04})_3O_4$ Ni-ferrite nanopowder (Comparative Example 1).

The present invention will now be described in detail.

In the present invention, "magnetic material" refers to magnetic materials referred to as "soft magnetic" (i.e., "soft magnetic material") and magnetic materials referred to as "semi-hard magnetic" (i.e. "semi-hard magnetic material"), and in particular, refers to a "soft magnetic" materials. Here, a "soft magnetic material" as referred to in the present invention is a magnetic material having a coercive force of 800 A/m (≈10 Oe) or less. In order to obtain an excellent soft magnetic material, it is important to have a low coercive force, a high saturation magnetization or permeability, and low iron loss. The causes of iron loss are mainly hysteresis loss and eddy current loss. In order to reduce the former, it is necessary to make the coercive force smaller, and in order to reduce the latter it is necessary for the electric resistivity of the material itself to be high, or to increase the electric resistance of the whole molded body to be subjected to practical use. A semi-hard magnetic material (in the present invention, this refers to a magnetic material with a coercive force exceeding 800 A/m and up to 40 kA/m≈500 Oe) needs to have an appropriate coercive force according to the application, and a high saturation magnetization and residual magnetic flux density. Among magnetic materials, soft magnetic or semi-hard magnetic materials used for high frequency generate a large eddy current, and hence it is important for the material to have a high electrical resistivity and that the powder particle diameter is small, or the sheet thickness is a thin sheet or ribbon.

The term "ferromagnetic coupling" as used in the present invention refers to a state in which adjacent spins in a magnetic material are strongly bound by exchange interaction. In particular in the present invention, this term refers to state in which the spins of two adjacent crystal grains (and/or amorphous grains) are strongly bound to each other by exchange interaction across the crystal boundary. As used herein, the "grains" such as crystal grains are masses that can be recognized as being composed of one or more "phases" and that have boundaries that separate them in three-dimensional space. The term "ferromagnetic coupling" is synonymous with "magnetically linked by exchange coupling". Since exchange interaction is an interaction that only reaches a distance based on the short range order of the material, when a nonmagnetic phase is present at the crystal boundary, exchange interaction does not work on the spins in the region on either side thereof, and hence ferromagnetic coupling does not occur between the crystal grains (and/or amorphous grains) on either side. In the present application, the term "crystal grain" may include amorphous grains. Further, the characteristics of the magnetic curve of the material in which ferromagnetic coupling has occurred between different adjacent crystal grains having different magnetic properties will be described later.

The term "disproportionation" as used in the present invention means that phases having two or more different compositions or different crystal structures are produced from a phase in a homogeneous composition by a chemical reaction. In the present invention, disproportionation is caused as a result of a reducing substance such as hydrogen being involved in a phase of the homogeneous composition leading to the occurrence of a reduction reaction. Although the chemical reaction that leads to this "disproportionation" is referred to herein as a "disproportionation reaction", water is often produced as a byproduct during this "disproportionation" reaction.

In the present invention, the expression "including an Fe component and a Ni component" means that the magnetic material of the present invention always contains Fe and Ni as components, and optionally the Ni may be substituted with a certain amount of other atoms (specifically, one or more of Co, Zr, Hf, Ti, V, Nb, Ta, Cr, Mo, W, Mn, Cu, Zn, and Si). Further, oxygen (O component) may be contained, and when an C) component or iron oxide hydroxide, or the like is present as a minor phase, H may be contained mainly as an OH group, and other unavoidable impurities as well as Cl or alkali metals such as K derived from raw materials may also be included. Alkali metals such as K are suitable components in that they may exert an effect of promoting the reduction reaction.

The term "magnetic powder" generally refers to a powder having magnetism, but in the present application a powder of the magnetic material of the present invention is referred to as "magnetic material powder". Therefore, the term "magnetic material powder" is included in the term "magnetic powder".

Further, in the present application, unless stated otherwise, the numerical ranges of the composition, size, temperature, pressure, and the like include the numerical values at either end thereof.

The present invention relates to a magnetic material comprising a phase (first phase) containing nickel in an α-Fe phase and a Ni-enriched phase (second phase) having a Ni content higher than the first phase. The best mode of the present invention is a "powder" in which the two phases are mixed and bonded at the nano level. These magnetic material powders are used for various devices by directly compacting or sintering. Further, depending on the application, an organic compound such as a resin, an inorganic compound such as glass or ceramic, a composite material thereof, or the like may be added and the resultant mixture may be molded.

Hereinafter, the composition, crystal structure and morphology, crystal grain size and powder particle diameter, and the production method of the first phase containing Fe and Ni and the second phase enriched with Ni will be described. In particular, a method for producing a nanocomposite oxide powder as a precursor of the magnetic material of the present invention, a method for reducing the powder, a method for solidifying the reduced powder, and a method for annealing in each step of these manufacturing methods, will be described.

<First Phase>

In the present invention, the first phase is a crystal having a bcc structure cubic crystal (space group Im-3m) containing Fe and Ni as a crystal structure. The Ni content of this phase is preferably 0.001 to 30 atom %. Specifically, the composition of the first phase may be represented by the composition formula $Fe_{100-x}Ni_x$ (where x is 0.001≤x≤30 in terms of atomic percentage).

Here, the Ni content and the Fe content are, unless stated otherwise, respectively the value of the atomic ratio of Ni or Fe relative to the total (in the present application sometimes referred to as "total amount") of Fe and Ni contained in the phase (first phase). In the present invention, this may be represented as an atomic percentage.

It is preferable that the Ni content is 30 atom % or less in order to suppress a decrease in magnetization. Further, the Ni content is more preferably 20 atom % or less because this means that, depending on the production method and conditions, a magnetization exceeding 2 T can be realized. In addition, the Ni content is even more preferably 12 atom %) or less, as this enables a magnetic material having a saturation magnetization exceeding 2.1 T to be produced. Further, depending on the manufacturing method and conditions, it is possible to produce a magnetic material in which the Ni content exceeds the magnetization of Fe in the range of 1 atom % or more and 12 atom % or less. Further, the Ni content is preferably 0.001 atom % or more, as this means that, unlike when Fe is used alone, the magnetic properties in the soft magnetic region can be adjusted by the effect of Ni addition. The particularly preferable range of the Ni content is 0.01 atom % or more and 20 atom % or less, and in this region, soft magnetic materials having various coercive forces can be prepared depending on the production conditions, and are magnetic materials having more preferable electromagnetic properties.

The first phase having a Fe—Ni composition having this bcc structure is also referred to as an "α-(Fe,Ni) phase" in the present application, since the symmetry of the crystal s the same as the α-phase, which is the room temperature phase of Fe. The term "α-(Fe,Ni) phase" also includes cases where Ni is substituted with an M component shown below.

When the content of the Ni of the first phase of the present invention is taken to be 100 atom %, 0.001 atom % or more and less than 50 atom % of the Ni can be with one or more of Co, Zr, Hf, Ti, V, Nb, Ta, Cr, Mo, W, Mn, Cu, Zn, and Si (in the present application, these substitution elements are also referred to as "M component"). Among these M components, co-adding a large number of elemental species to the soft magnetic material of the present invention is effective in reducing coercive force. In particular, in terms of atomic percentage when the Ni content of the first phase is taken to be 100 atom %, containing 1 atom % or more of one or more of Ti, V, Cr, and Mo is effective in enabling the nanocrystals of the present invention to be easily produced without largely depending on the cooling rate in the reduction treatment and the annealing treatment. Further, since Co, Zr, Hf, Ti, Cr, V, Mn, Zn, Ta, Cu, and Si decrease the anisotropic magnetic field, they are preferable as components coexisting with the soft magnetic material of the present invention. One or more of Zr, Hf, Ti, V, Nb, Ta, Cr, Mo, and W suppress improper grain growth during the reduction step even when 1 atom % or less is added in terms of atomic percentage when the Ni component content of the first phase is taken to be 100 atom %. Ti, Cu, Zn, Mn, and Si are preferable for improving oxidation resistance and molding properties. Co is preferred to improve saturation magnetization. In particular, when Ni and Co are co-added between 50.001:49.999 and 99.999:0.001, a magnetic material having a small anisotropic magnetic field and a large saturation magnetization is obtained, which is particularly preferable.

A more preferable M component content is not dependent on the elemental species, and is 1 to 30 atom % or less in terms of the substitution quantity for Ni.

In the present application, note that "improper grain growth" means that the nano-microstructure of the magnetic material of the present invention collapses and crystal grains grow with a homogeneous crystal structure. On the other hand, "suitable grain growth" in the present invention is growth in which the powder particle diameter grows to be large while maintaining the nano-microstructure that is a characteristic of the present invention, or growth in which a nano-microstructure appears in the crystal due to a disproportionation reaction, phase separation or the like after the powder panicle diameter has grown to be large, or both of these cases. Unless otherwise noted, the term "grain growth" in the present invention refers to the above mentioned "improper grain growth" and that can generally be said to be suitable. Even when the grain growth is improper or suitable, the surface area of the magnetic material per unit mass or per unit volume becomes small, and hence oxidation resistance generally tends to be improved.

For any of the M components, from the perspective of the addition effect described above, the added amount is preferably 0.001 atom % or more in terms of the atomic percentage when the Ni component content of the first phase is taken to be 100 atom %, and from the perspective of preventing inhibition of the various effects of the Ni component in the magnetic material of the present invention, the added amount is preferably less than 50 atom %. In the present invention, when expressed as "Ni component", or when expressed as "Ni", "nickel" in the context of discussing formulas such as "α-(Fe,Ni)" phase or the composition of the magnetic material, the present invention includes not only cases in which Ni is used alone, but also compositions in which 0.001 atom % or more and less than 50 atom % of the Ni content is substituted with an M component. Therefore, in the present application, when expressed as "total of Fe and Ni", when the components other than Fe are Ni alone, it means the total of the Fe content and the Ni content, and for a composition in which 0.001 or more and less than 50 atom % of the Ni content is substituted with the NI component, means the total of the Fe content, the Ni content, and the content of the M component. In addition, although it is necessary to remove as much as possible impurities mixed in during the steps, unavoidable impurities such as H, C, Al, S, N, alkali metals such as Li, K and Na, alkaline earth metals such as Mg, Ca, Sr, rare earth metals, halogens such as Cl, F, Br, I, and the like may be included. However, the content of such impurities is to be 5 atom % or less, preferably 2 atom % or less, more preferably 0.1 atom % or less, and particularly preferably 0.001 atom % or less, of the whole (i.e., total of Fe and Ni contained in the first phase). This is because the greater the content of these impurities, the lower the magnetization, and in some cases, the coercive force is also adversely affected, which depending on the application may deviate from the target range. On the other hand, when some components, such as alkali metals like K, which act as reducing aids if contained to some extent, are contained in an amount of 0.0001 atom % or more and 5 atom % or less of the total (i.e., total of Fe and Ni contained in the first phase), a magnetic material having a higher saturation magnetization may be obtained. Therefore, when the above-mentioned impurities hinder the object of the present invention, it is particularly desirable not to include such impurities.

The α-Fe phase not containing Ni is not included in the first phase or the second phase. The reason for this is that if the content of elements other than Ni is also extremely small, the α-Fe phase not containing Ni is expected to have saturation magnetization like electromagnetic soft iron, but even if the α-Fe phase is a powder in the nano region, the effect on electric resistivity is poor, oxidation resistance is poor, and the material is inferior in cutting processability. However, the α-Fe phase not containing Ni may exist as a separate phase as long as it does not hinder the object of the present invention. The volume fraction of the α-Fe phase is preferably less than 50% by volume based on the whole magnetic material of the present invention.

The volume fraction referred to here is the ratio of the volume occupied by the target component based on the total volume of the magnetic material.

<Second Phase>

In the present invention, the second phase is a phase in which the Ni content relative to the total of Fe and Ni contained in the phase is larger than the Ni content relative to the total of Fe and Ni contained in the first phase. Examples of the second phase may include cubic crystals such as an $\alpha$-$(Fe_{1-y}Ni_y)$ phase (phase in space group lm-3m having the same crystalline phase as the first phase, but a higher Ni content than the first phase), a $\gamma$-(Fe,Ni) phase (space group Fm-3m), a $FeNi_3$ phase, a wustite phase (representative composition is a $(Fe_{1-z}Ni_z)_aO$ phase, a is usually 0.83 or more to 1 or less, and is a solid solution of FeO and NiO; in the present specification this phase is sometimes simply referred to as a "(Fe, Ni)O phase" or a "(Ni,Fe)O phase". In the present invention, unless stated otherwise, the term wustite refers to a NiO phase (composition of $0<z\leq1$ including NiO)), a Ni-ferrite phase (representative composition is $(Fe_{1-w}Ni_w)_3O_4$ phase in which $0<w<1/3$) and the like, a tetragonal FeNi phase and the like, an $\alpha$-$(Fe,Ni)_2O_3$ phase (Ni-fematite phase), which is a rhombohedral crystal, and the like, and further a Ni—Fe amorphous phase and the like, or a mixture thereof. The content of the Ni—Fe amorphous phase is 0.001% by volume or more and 10% by volume or less, and is preferably not more than this from the viewpoint of suppressing the reduction in magnetization. In addition, in order to confer high magnetization to the magnetic material, this content is preferably 5% by volume or less. The amorphous phase and the like may be contained in order to control the disproportionation reaction itself, but in this case, it is preferable to set the content to more than 0.001% by volume from the perspective of controlling this reaction.

The volume fraction referred to here is the ratio of the volume taken up by the subject component to the volume of the whole magnetic material.

The second phase described above mostly has an inferior saturation magnetization to that of the first phase, but the coexistence of these phases may result in a large increase in electrical resistivity. Furthermore, in the present invention, when forming a soft magnetic material, depending on the crystal structure, composition, microstructure, interface structure and the like of the phases, it is possible to realize a small coercive force by ferromagnetically coupling with the phases. In addition, in the second phase as well, similarly to the first phase, it is possible to substitute less than 50 atom % of the Ni content (wherein the content of the total Ni in the second phase is taken to be 100 atom %) with an M component.

<Minor Phase, Other Phases>

A phase that does not contain Fe or Ni, and that is mixed with only an M component compound, is not included in the first phase or the second phase. However, there are cases where such a phase contributes to improving properties of electric resistivity, oxidation resistance, and sinterability. In the present application, a phase that does not contain a Ni component, such as a compound phase of the above-mentioned M component or an Fe compound phase, and a phase in which the content of the M component is equal to or more than the content of the Ni element, is referred to as a "minor phase".

Other than the first phase and the second phase, the magnetic material may also contain a minor phase that does not contain Ni, such as a wustite phase, a magnetite phase $(Fe_3O_4)$, a maghemite phase $(\gamma$-$Fe_2O_3)$, a hematite phase $(\alpha$-$Fe_2O_3)$, an $\alpha$-Fe phase, and a $\gamma$-Fe phase, an iron oxide hydroxide phase that may or may not contain Ni, such as goethite, akagenite, lepidocrocite, ferroxyhyte, ferrihydrite, green rust, a hydroxide such as potassium hydroxide and sodium hydroxide, a chloride such as sodium chloride and potassium chloride, a fluoride, a carbide, a nitride, a hydride, a sulfide, a nitrate, a carbonate, a sulfate, a silicate, a phosphate, and the like. The volume of the above minor phase or the like needs to be smaller than the total volume of the $\alpha$-(Fe, Ni) phases in the first phase or in the first phase and the second phase in order for the magnetic material of the present invention to have a high saturation magnetization and also to exhibit stable magnetic properties and high magnetization over time. From the perspective of suppressing a decrease in the saturation magnetization, the preferable range of the content of these phases is 50% by volume or less based on the volume of the whole magnetic material.

The content of the M component in all of the phases, including the first phase, the second phase, and the minor phase, must not exceed the Ni content contained in the first phase and the second phase based on all the phases. This is because when the content of the M component exceeds the Ni content, the unique characteristic effects on electromagnetic properties specific to Ni, for example, improved magnetization when a small amount is added and suppression of a decrease in magnetization when more than that amount is added, improvement in electric resistivity, a remarkable effect on oxidation resistance, and the like, are lost. In the present application, the Ni content of the first phase and/or the second phase is an amount that includes the M component.

<Case in which Second Phase has Same Crystal Structure as First Phase>

Although the second phase may have the same crystal structure as the first phase, it is important that the phases are sufficiently different from each other in terms of their composition. For example, it is preferable that the Ni content of the second phase is 1.1 times or more larger than the Ni content of the first phase, or that the Ni content of the second phase (i.e., Ni content in the second phase relative to the total of Fe and Ni contained in the second phase) is 2 atom % or more than the Ni content of the first phase (i.e., Ni content in the first phase relative to the total of Fe and Ni contained in the first phase), and more preferable that both of those are satisfied (i.e., the Ni content of the second phase be 1.1 times or more and 2 Atom % or more than the Ni content of the first phase).

The Ni component content itself of the second phase does not exceed 100 atom %, When the lower limit of the Ni content of the first phase is 0.001 atom %, the Ni content of the second phase does not exceed $10^5$ times the Ni content of the first phase. The Ni content of the second phase is preferably 80 atom % or less of the Ni content of the first phase. This is because when the Ni content exceeds 80 atom % (i.e., when the Ni content of the second phase exceeds $8\times10^4$ times the lower limit of the Ni content of the first phase) while the second phase maintains the same crystal structure as that of the first phase at ordinary temperature, the thermal stability of the whole magnetic material of the present invention may deteriorate.

In the above, the case described as the "Ni content" of the second phase being "1.1 times or more" that of the first phase refers to a case in which, when the Ni content of each phase is calculated to one significant digit or more, the Ni content of the second phase is 1.1 times or more the Ni content of the first phase.

It is an objective of the present invention to lower coercive force by utilizing the magnetic anisotropy fluctuations in the above-mentioned random magnetic anisotropy model or a model in accordance therewith. Therefore, it is important either that the first phase and the second phase, which are adjacent but crystallographically independent, are magnetically coupled at the nano level by exchange coupling, or that the Ni content in the bcc phase including the first phase and the second phase has a spatial change at the nanoscale (this is sometimes referred to in the present invention as a "concentration fluctuation"). However, if the Ni composition ratio of the Ni component of these two phases is too close, there are cases where the crystal orientations of the crystalline phases are aligned in the same direction, preventing a sufficiently low coercive force from being realized. Therefore, the preferable Ni content of the second phase is 1.1 times or more that of the first phase, more preferably 1.2 times or more, and most preferably 1.5 times or more. The upper limit is preferably $10^5$ times.

If there is a phase (first phase) in which the Ni content is lower than the Ni content of the whole magnetic material of the present invention, this means that in the same magnetic material there will be a phase (second phase) in which the Ni content is higher than that of the magnetic material of the present invention. Therefore, if isotropy is realized as a result of those phases ferromagnetically coupling, the material will be the magnetic material of the present invention, specifically a soft magnetic material. Further, if the material is interposed at the interface of the first phase, has a coercive force within the appropriate range, and has an action of increasing electric resistance, then the material will be the magnetic material of the present invention, specifically a semi-hard magnetic material. Even when the material is not sufficiently isotropic, if there is spatial concentration fluctuation of the Ni content in a given crystalline phase, there will be fluctuation in the magnetic anisotropy, and the coercive force may decrease by a mechanism that is slightly different from the random anisotropy model. In general, the magnetic material of the present invention, in which the coercive force decreases by such a mechanism has a Ni content relative to the total of Ni component and Fe component in the magnetic material of 10 atom % or less. The above is one characteristic of the magnetic material of the present invention that is not seen in most existing soft magnetic materials such as electromagnetic steel sheets and sendust, which have highly homogenous compositions designed to thoroughly eliminate heterogeneity so as not to inhibit domain wall movement. This characteristic can be said to be common with magnetic materials in which magnetization reversal occurs due to the rotation of magnetization.

It is an objective of the present invention to lower coercive force according to the above-mentioned random magnetic anisotropy model. Therefore, it is important that the first phase and the second phase, which are adjacent but crystallographically independent, are magnetically coupled at the nano level by exchange coupling. However, if the Ni composition ratio of these two phases is too close, there are cases where the crystal orientations of the crystalline phases are aligned in the same direction, and in addition, the magnitude of the magnetocrystalline anisotropy constant is often smaller in the second phase. However, when the Ni content of the second phase is less than 1 atom % relative to the total of Fe and Ni in the second phase, the crystalline magnetic anisotropy increases and when the value of the fluctuations averaged in crystalline magnetic anisotropy is not sufficiently small. As a result, a sufficiently low coercive force is not realized. Therefore, the preferable Ni content of the second phase is 1 atom % or more relative to the total of Fe and Ni in the second phase, and more preferably 3 atom % or more. If the Ni content is too large magnetic anisotropy is reduced, but saturation magnetization decreases, and therefore the Ni content is preferably 80 atom % or less.

It is obvious that even when the first phase and the second phase, which are close in terms of their composition, are adjacent to each other, they are nano-dispersed, the crystal orientations are different, the easy magnetization directions are not consistent, and yet if exchange coupling occurs via twin walls, crystal grain boundaries, crystal boundaries, or the like, isotropy is realized and the coercive force is reduced. However, since the frequency of this per unit volume is much smaller than when the compositions differ to some extent, sufficient averaging of the magnetocrystalline anisotropy according to the random magnetic anisotropy model may not be achieved in some cases.

If there is a phase (first phase) in which the Ni content is lower than the Ni content of the whole magnetic material of the present invention, this means that in the same magnetic material there will always be a phase (second phase) in which the Ni content is higher than that of the magnetic material of the present invention. Therefore, if isotropy is realized as a result of those phases ferromagnetically coupling, the material will be the magnetic material of the present invention, specifically a soft magnetic material. The above is a characteristic of the magnetic material of the present invention that is not seen in most existing soft magnetic materials such as electromagnetic steel sheets and sendust, which have highly homogenous compositions designed to thoroughly eliminate heterogeneity so as not to inhibit domain wall movement. This characteristic can be said to be common with magnetic materials in which magnetization reversal occurs due to the rotation of magnetization.

It may be noted that a state in which the adjacent phase is only the first phase or the adjacent phase is only the second phase is magnetically coupled at the nano level by exchange coupling may be included in the present invention. Even in this case, it is important for the crystal axis directions of adjacent nanocrystals not to be aligned, to be isotropic and/or for there to be a fluctuation in Ni concentration at the nanoscale. However, in the present invention, it is impossible to achieve a magnetic material composed of microcrystals of only the first phase or a magnetic material composed of microcrystals of only the second phase, and even when such a structure is included, in the present invention, the first phase and the second phase always exist in the magnetic material. The reason for this is that the formation of the nanocrystals per se plays a large role in the disproportionation reaction in each of the processes of the reduction step that kicks off with reduction of the nanoscale ferrite powder containing nickel that is used for producing the magnetic material of the present invention (in the present application, also referred to as "nickel ferrite nanopowder" or "Ni-ferrite nanopowder").

Therefore, specific examples of the state of the phase adjacent to at least one phase of the first phase or the second phase in the magnetic material of the present invention may include cases in which the first phase and the second phase are adjacent to each other, cases in which first phases are adjacent to each other, and cases in which second phases are adjacent to each other. These adjacent phases are in a state of being magnetically coupled by exchange coupling (in a state of ferromagnetic coupling). However, since the first phase and the second phase are always contained in the magnetic material, there exists at least one phase in which the first phase and the second phase are adjacent to each other.

In the present application, a nanoscale ferrite powder is also referred to as a "ferrite nanopowder", and the term "nanoscale" means, unless defined otherwise, 1 nm or more and less than 1 μm.

<Specification of Second Phase>

How to specify the second phase will now be described. First, as described above, the first phase is an α-(Fe,Ni) phase, which is mainly to guarantee a high saturation magnetization. The second phase is a phase whose Ni content relative to the total of Fe and Ni contained in that phase is higher than the Ni content relative to the total of Fe and Ni contained in the first phase. In the present invention, the second phase may be an α-(Fe,Ni) phase whose Ni content is higher than the Ni content of the whole magnetic material, or may be another crystalline phase, an amorphous phase, or a mixed phase thereof. In any case, the soft magnetic material of the present invention has an effect of keeping the coercive force low. Therefore, since the second phase is an aggregate of phases having these effects, if the Ni content is higher than that of the first phase, and it is possible to show the presence of any of the phases exemplified above, that material can be understood as being the magnetic material of the present invention.

If the second phase is an α-(Fe,Ni) phase, the Ni composition may continuously change from that of the first phase. Alternatively, depending on the method for identifying the material, it may appear as if the Ni composition of the second phase continuously changes from the first phase. In such a case as well, it is desirable that there be a compositional difference, such as the Ni content of the second phase (i.e., Ni content in the second phase relative to the total of Fe and Ni contained in the second phase) is larger than the Ni content of the first phase (i.e., Ni content in the first phase relative to the total of Fe and Ni contained in the first phase), and moreover, that the Ni content of the second phase is 1.1 times or more and/or 2 atom % or more than the Ni content of the first phase.

The composition ratio of Fe and Ni is not particularly limited as long as the object of the present invention can be achieved, but is desirably, when the first phase and the second phase are combined, 1:1 or less. Specifically, the Ni content relative to a total amount of Fe and Ni of 100 atom % is desirably 0.01 atom % or more and 50 atom % or less.

The Ni content including the first phase and the second phase together is particularly preferably 50 atom % or less in order to avoid a reduction in the saturation magnetization, and is preferably 0.01 atom % or more in order to avoid having no effect of adding the Ni on oxidation resistance and to avoid the coercive force becoming so high that it does not correspond to the intended use. Further, from the perspective of a good balance between oxidation resistance and magnetic properties, the Ni content when the first phase and the second phase are combined is preferably 0.01 atom % or more and 30 atom % or less, and a particularly preferable range is 0.01 atom % or more and 20 atom % or less.

Although the volume ratio of the first phase and the second phase is arbitrary, the total of the volume of the α-(Fe,Ni) phase in the first phase, or the α-(Fe,Ti) phase in the first phase and the second phase based on the whole magnetic material of the present invention including the first phase, the second phase, and the minor phase is preferably 5% by volume or more. Since the α-(Fe,Ni) phase is responsible for the main magnetization of the magnetic material of the present invention, the α-(Fe,Ni) phase volume is preferably 5% by volume or more in order to avoid a reduction in magnetization. Further, the α-(Fe,Ni) phase volume is preferably 25% by volume or more, and more preferably 50% by volume or more. In order to realize a particularly high magnetization without substantially reducing the electric resistivity, it is desirable to set the total of the α-(Fe,Ni) phase volume to 75% by volume or more.

In the second phase of the soft magnetic material of the present invention, it is preferable that there is a ferromagnetic phase or an antiferromagnetic phase (in the present application, weak magnetism is also included therein) because there is an effect of reducing the magnetocrystalline anisotropy of the first phase. In the present application, this is discussed in conjunction with the following explanation of the random magnetic anisotropy model.

<Example of Preferable Second Phase>

In the magnetic material of the present invention, a representative example of a preferable second phase for ferromagnetism is, first, an α-(Fe,Ni) phase having a larger Ni content than that of the first phase, and preferably having a Ni content of, relative to the total of Fe and Ni in the second phase, 0.1 atom % or more and 20 atom % or less, more preferably 0.5 atom % or more and 15 atom % or less, and particularly preferably 1 atom % or more and 8 atom % or less.

A low coercive force is realized when the Ni content of the first phase relative to the total of Fe and Ni in the first phase is 20 atom % or more and 30 atom % or less. However, when the Ni content is increased to such a degree, a saturation magnetization of close to 2 T cannot be exhibited. Therefore, it is preferable to realize a magnetic material having a large saturation magnetization and a small coercive force by combining a first phase having a Ni content of 0.01 atom % or more and 20 atom % or less (and more preferably 1 atom % or more and 12 atom % or less) relative to the total of Fe and Ni in the first phase, and a second phase having a Ni content higher than that of the first phase. The size of the crystal grains of the first phase is set to 100 inn or less and preferably 500 nm or less, and the crystal axis directions of these crystal grains are preferably not aligned in one direction but random.

Examples of the method for verifying that the crystal orientation is random include the following various methods of examining the orientation of the crystal axis.

(i) Method in which at least two diffraction lines of each diffraction line position, which are the three strong lines of (110), (200) and (211) among the diffraction patterns of the α-(Fe,Ni) phase measured using XRD (X-ray diffractometer) are selected and compared, and the crystal orientation is confirmed by looking at the intensity ratio thereof. If the intensity ratio is close to the intensity ratio of the powder pattern, that is one proof that the orientation is random.

(ii) Method in which of the distribution of the crystal orientation in a measurement region is known based on pole point measurement using XRD, and the orientation is estimated.

(iii) As a method for examining the orientation of crystal grains that are several hundred nm, there is a method in which the crystal orientation and the crystal system are determined using an EBSD (electron backscatter diffraction) apparatus attached to an SEM (scanning electron microscope).

(iv) As a method of confirming the randomness of local crystal grains of several to several tens of nm, there is a method for knowing, when measurement is carried out using an ED (electron beam diffractometer) attached to a TEM (transmission electron microscope), that the crystal orientation is random in the observation region when diffraction spots do not clearly appear and a ring pattern is observed.

(v) As another method of observing local crystal orientation, there is a method for examining the crystal orientation by observing the direction of lattice stripes at a crystal boundary and the arrangement of atoms by TEM observation. More specifically, the plane orientations of the crystal grains on both sides across a crystal boundary are observed and compared.

(vi) As a method of macroscopically observing this crystal boundary, there is a method of using an FE-SEM (field emission scanning electron microscope) to know the direction of twin walls and the shape of the crystal boundary. In an extreme case, when the crystal boundary draws a circular arc, a complicated curve, or a maze pattern, it exhibits an intergrowth structure in which intergrowths are intricately formed from various directions, so that the crystal orientation becomes random.

These methods can be combined as appropriate depending on the fine structure of the magnetic material of the present invention and the magnitude of the crystal grain size. The orientation of the crystal grains of the magnetic material of the present invention can also be judged comprehensively by combining with a method of knowing the local composition, which is described later. It is also noted that in the method of (v) and (vi), when the grain boundary region between the first phases, the first phase and the second phase, or the second phases or the region largely occupied by the first phase and/or the second phase are observed and no heterophases are at the grain boundaries, that can serve as evidence of the occurrence of ferromagnetic coupling between adjacent particles.

Next, as examples of a preferable second phase, there can be mentioned both the oxide phases of the Ni-ferrite phase and the wustite phase. The former is ferromagnetic and the latter is antiferromagnetic, but either of them can promote ferromagnetic coupling if it is in the first phase.

Although examples in which the ferrite phase promotes ferromagnetic coupling are also known (see "WO 2009/057742 A1" (hereinafter, referred to as "Patent Document 3"), and N. Imaoka, Y. Koyama, T. Nakao, S. Nakaoka, T. Yamaguchi, E. Kakimoto, M. Tada, T. Nakagawa, and M. Abe, J. Appl. Phys., Vol. 103, No. 7 (2008) 07E129 (hereinafter, referred to as "Non Patent Document 3")), in all of those cases, a ferrite phase is present between $Sm_2Fe_{17}N_3$ phases of a hard magnetic material, and those phases are ferromagnetically coupled to constitute an exchange spring magnet.

However, the present invention relates to a soft magnetic material, and exhibits completely different functions from those of the above-mentioned hard magnetic exchange spring magnet, in the present invention, if such a second phase is present so as to surround the first phase through an exchange interaction between first phases due to the presence of the second phase, which is a Ni-ferrite phase or a wustite phase, electric resistance is also high, and coercive force is also reduced. Therefore, this is a particularly preferable second phase for the soft magnetic material of the present invention.

These two kinds of oxide phases are preferably 95% by volume or less of the whole magnetic material. This is because, for example, although Ni-ferrite is a ferromagnetic material, its magnetization is lower than that of an α-(Fe,Ni) phase, and although wustite is also weakly magnetic even though it is antiferromagnetic, and hence there is some magnetization, that magnetization is less than that of Ni-ferrite, so that if the volume of either of these exceeds 95 volume %, the magnetization of the whole magnetic material may decrease. More preferably, the content of the oxide phase is 75% by volume or less, and particularly preferably 50% by volume or less. In the case of producing a magnetic material having particularly high magnetization while maintaining electric resistivity to a certain extent, it is preferable to set the volume of the oxide phases to 25% by volume or less. On the other hand, when an oxide phase such as a wustite phase is present, the electric resistivity increases. Therefore, when a wustite phase or the like is intentionally contained for this reason, the volume fraction is preferably 0.001% by volume or more. In order to have a wustite phase and the like be present without excessively decreasing the magnetization, and to effectively improve the electric resistivity, the volume is more preferably set to 0.01% by volume or more, and particularly preferably to 0.1% by volume or more. Here, even when the oxide phases do not include Ni-ferrite and are assumed to be wustite, the above-mentioned volume fraction range is the same.

As described above, as a preferable second phase, an α-(Fe,Ni) phase having a higher Ni content than the first phase, a Ni-ferrite phase, and a wustite phase have been mentioned as examples. These three phases are ferromagnetic or antiferromagnetic. Therefore, if these phases are separated without ferromagnetic coupling, since the magnetic curve has additivity, the magnetic curves of these mixed materials are simply the total of the respective magnetic curves, and a smooth step is produced on the magnetic curve of the whole magnetic material. For example, by observing the shape of the ¼ major loop (the magnetic curve when swept from 7.2 MA/m to the zero magnetic field is called the ¼ major loop) of the magnetic curve of the whole magnetic material, which is obtained by measuring the magnetization over a wide magnetic field range of 0 to 7.2 MA/m of an external magnetic field, it can be inferred that the smooth step on the ¼ major loop is due to the above-mentioned circumstances or that there is certainly an inflection point based thereon. On the other hand, when these dissimilar magnetic materials are formed as one body by ferromagnetic coupling, a smooth step or an inflection point is not seen on the major loop in the range of 7.2 MA/m to the zero magnetic field, but a monotonically increasing magnetic curve with a convex portion at the top is produced. In order to estimate the existence of ferromagnetic coupling, in addition to observing the fine structure at the grain boundary region as described above, the above-mentioned detailed observation of the magnetic curve is also one measure.

Among the preferred second phases, which are the above-mentioned oxide phase, in particular the wustite phase is a very preferable phase in terms of constituting the magnetic material of the present invention it can be stably present even at high reduction temperatures and molding temperatures. In addition, the α-(Fe,Ni) phase having various compositions that is produced from this phase by a disproportionation reaction mainly in the reduction step is an important phase responsible for the magnetic body that the magnetic material of the present invention expresses as the first phase or as the first and second phases. When the Ni content of this α-(Fe,Ni) phase is in the region of 0.5 atom % or more, a reduction reaction to a highly magnetic metal phase proceeds via the wustite phase in particular. Therefore, in many cases, the α-(Fe,Ni) phase is already directly ferromagnetically coupled with the wustite phase from the stage of the disproportionation reaction, and is a very preferable phase to use as the second phase of the magnetic material of the present invention, an in particularly the second phase of a soft magnetic material.

<Composition Analysis>

In the examples of the present application, local composition analysis of the metal elements of the magnetic material of the present invention is mainly carried out by EDX (energy dispersive X-ray spectroscopy), and the composition analysis of the whole magnetic material is carried out by XRF (X-ray fluorescence elemental analysis). Generally, the Ni content of the first phase and the second phase is measured by an EDX apparatus attached to an SEM, an FE-SEM, a TEM, or the like (in the present application, this FE-SEM etc. equipped with an EDX is also referred to as an "FE-SEM/EDX", for example). Depending on the resolution of the apparatus, if the crystal structure of the first phase and the second phase is a fine structure of 300 nm or less, accurate composition analysis cannot be performed with an SEM or FE-SENT. However, to detect only the difference in the Ni or Fe components of the magnetic material of the present invention, those apparatuses can be utilized in a supplementary manner. For example, in order to find a second phase that is less than 300 nm and has a Ni content of 5 atom % or more, a certain point in the magnetic material is observed, and if the quantitative value of that point can be confirmed as having a Ni content of 5 atom % or more, then that means that a structure having a Ni content of 5 atom % or more or a part of such a structure is present within a diameter of 300 nm centered on that one point. Conversely, to find a first phase having a Ni content of 2 atom % or less, a certain point is observed in the magnetic material, and if the quantitative value of that point can be confirmed as having a Ni content of 2 atom % or less, then that means that a structure having a Ni content of 2 atom % or less or a part of such a structure is present within a diameter of 300 nm centered on that one point.

Further, as stated above, by combining this composition analysis method with XRD, FE-SEM, TEM, and the like, it is possible to know the orientation and composition distribution of the crystal grains, which is useful for verifying whether the Ni composition, which is a characteristic of the present invention, has disproportionated and various crystalline phases are present, and whether their crystal axes are randomly oriented or not. Furthermore, to distinguish the α-(Fe,Ni) phase from the other oxide phases, such as a wustite phase, it is convenient and effective to analyze the oxygen characteristic X-ray surface distribution map using, for example, SEM-EDX.

<Composition of Whole Magnetic Material>

The composition of the whole magnetic material (i.e., respective composition when the total of the component contents constituting the whole magnetic material is taken to be 100 atom %) in the present invention is in the range of, based on the composition of the whole magnetic material, 20 Atom % or more and 99.999 atom % or less of the Fe component, 0.001 atom % or more and 50 atom % or less of the Ni component, and 0 atom % or more and 55 atom % or less of O (oxygen). Preferably, all of these ranges are simultaneously satisfied. Further, an alkali metal may be contained in the range of 0.0001 atom % or more and 5 atom % or less. It is desirable that the minor phase including K and the like does not exceed 50% by volume of the whole.

It is preferable that Fe is 20 atom % or more because a reduction in the saturation magnetization can be avoided. It is preferable that Fe is 99.999 atom % or less because a reduction in the oxidation resistance and deterioration in workability can be avoided. Also, it is preferable that the Ni component is 0.001 atom % or more because a reduction in the oxidation resistance and deterioration in workability can be avoided. It is preferable that the Ni component is 50 atom % or less because a reduction in the saturation magnetization can be avoided. When O is an important element for forming the second phase, it is preferable that O is in a range of 55 atom % or less because not only a reduction in the saturation magnetization can be avoided, but a situation in which the disproportionation reaction in the first phase and the second phase by reduction of the nickel ferrite nanopowder does not occur, making it more difficult to develop to a low coercive force soft magnetic material can be avoided. Although the magnetic material of the present invention does not necessarily need to contain oxygen, it is desirable that even a slight amount be contained in order to obtain a magnetic material with remarkably high oxidation resistance and electric resistivity. For example, it is possible to passivate the surface of the metal powder reduced by the gradual oxidation step (described later), or to cause an oxide layer composed of wustite and the like to be present at a part of the crystal grain boundary of the solid magnetic material by that passivation action. In this case, the respective composition ranges of the whole magnetic material of the present invention are desirably 20 to 99.998 atom % or less (20 atom % or more and 99.998 atom % or less) of the Fe component, 0.001 to 50 atom % (0.001 atom % or more and 50 atom % or less) of the Ni component, and 0.001 to 55 atom % (0.001 atom % or more and 55 atom % or less) of O.

A more preferable composition of the magnetic material of the present invention is 50 atom % or more and 99.98 atom % or less of the Fe component, 0.01 atom % or more and 49.99 atom % or less of the Ni component, and 0.01 atom % or more and 49.99 atom % or less of O. In this range, the magnetic material of the present invention has a good balance between saturation magnetization and oxidation resistance.

Furthermore, the magnetic material of the present invention having a composition in which the Fe component is in the range of 66.95 atom % or more and 99.9 atom % or less, the Ni component is in the range of 0.05 atom % or more and 33 atom % or less, and O is in the range of 0.05 atom % or more and 33 atom % or less is preferable from the perspective of having excellent electromagnetic properties and excellent oxidation resistance.

Within the above composition ranges, when the magnetic material of the present invention is to have an excellent performance, in particular, a magnetization of 1 T or more, a preferable composition range is 79.95 atom % or more and 99.9 atom % or less for the Fe component, 0.05 atom % or more and 20 atom % or less for the Ni component, and 0.05 atom % or more and 20 atom % or less of O.

Since it also depends on the Ni component content, and hence cannot be unconditionally stated, in the present invention a soft magnetic material having a small coercive force tends to contain more oxygen.

<Magnetic Properties, Electrical Properties, and Oxidation Resistance>

One aspect of the present invention is a magnetic material having magnetic properties suitable for soft magnetic applications with a coercive force of 800 A/m or less. This point is now described below.

The term "magnetic properties" as used herein refers to at least one of the magnetic material's magnetization J (T), saturation magnetization $J_s$ (T), magnetic flux density (B), residual magnetic flux density $B_r$ (T), exchange stiffness constant A (J/m), magnetocrystalline anisotropy magnetic field $H_a$ (A/m), magnetocrystalline anisotropy energy $E_a$ (J/m$^3$), magnetocrystalline anisotropy constant K$_1$ (J/m$^3$), coercive force H$_{cB}$ (A/m), intrinsic coercive force H$_{cJ}$ (A/m), permeability μμ$_0$, relative permeability μ, complex permeability μ$_r$μ$_0$, complex relative permeability μ$_r$, its real term μ', imaginary term μ", and absolute value |μ$_r$|. In the present specification, A/m from the SI unit system and Oe from the cgs Gauss unit system are both used as the units of the "magnetic field". The formula for conversing between those values is 1 (Oe)=1/(4π)×10$^3$ (A/m). More specifically, 1 Oe is equivalent to about 80 A/m. As the units for the "saturation magnetization" and "residual magnetic flux density" in the present specification, T from the SI unit system and emu/g from the cgs Gauss unit system are both used. The formula for converting between those values is 1 (emu/g)=4π×d/10$^4$ (T), where d (Mg/m$^3$=g/cm$^3$) represents density. Therefore, since d=7.87 for Fe, Fe having a saturation magnetization of 218 emu/g has a saturation magnetization value M$_s$ in the SI unit system of 2.16 T. In the present specification, unless stated otherwise, the term "coercive force" refers to the intrinsic coercive force H$_{cJ}$.

The term "electrical properties" used herein refers to the electric resistivity (=volume resistivity) ρ (Ωm) of the material. The term "oxidation resistance" used herein refers to a change over time in the magnetic properties in various oxidizing atmospheres, for example, a room-temperature air atmosphere.

The above-mentioned magnetic properties and electrical properties are collectively referred to as "electromagnetic properties".

In the magnetic material of the present invention, it is preferable that the magnetization, the saturation magnetization, the magnetic flux density, the residual magnetic flux density, and the electric resistivity are higher. For the saturation magnetization, a value as high as 0.3 T or 30 emu/g or more is desirable. For soft magnetic materials in particular, a value as high as 100 emu/g or more is desirable. Other magnetic properties of the present invention, such as the magnetocrystalline anisotropy constant, the coercive force, the permeability, the relative permeability, and the like are appropriately controlled depending on the application. In particular, depending on the application, the permeability and relative permeability do not always have to be high. As long as the coercive force is sufficiently low and the iron loss is suppressed to a low level, for example, the relative permeability may even be adjusted to a magnitude in the range of 10$^0$ to around 10$^4$. In particular, by suppressing the magnetic saturation under a direct-current superimposed magnetic field, it is possible to suppress the deterioration in efficiency and facilitate linear control, or based on the relational expression (1), each time the permeability is reduced by one digit, the critical thickness at which eddy current loss occurs can be increased by a factor of about 3.2. One of the characteristics of the present invention lies in comprising a magnetization reversal mechanism that is based mainly on direct rotation of magnetization, and not only on magnetization reversal due to domain wall movement. As a result, the coercive force is low, eddy current loss due to domain wall movement is small, and iron loss can be suppressed to a low level. Moreover, it is possible to generate some local magnetic anisotropy at the crystal boundary for suppressing magnetization rotation by the external magnetic field, and to reduce permeability <Crystal Boundaries>

Whether the magnetic material of the present invention becomes soft magnetic is closely related in particular to the fine structure of the magnetic material. Although an α-(Fe, Ni) phase may at a glance look as if they are a continuous phase, as shown in FIG. 1, the magnetic material contains many heterogenous phase interfaces and crystal grain boundaries. Further, the magnetic material contains crystals such as twin crystals including simple twins such as contact twins and penetrating twins, recurring twins such as polysynthetic twins, cyclic twins, and multiple twins, intergrowths, and skeleton crystals (in the present invention, when crystals are classified not only by the heterogenous phase interface and the polycrystalline grain boundary but also by the various crystal habits, tracht, intergrowth structures, dislocations, and the like described above, those boundary surfaces are collectively referred to as "crystal boundaries"). In many cases, unlike linear grain boundaries which are generally often seen, the crystal boundaries are often presented as a group of curves, and furthermore, in such a structure, there is seen a large difference in Ni content depending on location. The magnetic material of the present invention having such a fine structure is often a soft magnetic material.

In the case where the magnetic material of the present invention is a soft magnetic material, when the second phase is an α-(Fe,Ni) phase, starting from a nickel ferrite nanopowder, as the first phase and the second phase undergo grain growth, and as the reduction reaction progresses, the oxygen in the crystal lattice is lost in conjunction with the disproportionation reaction of the composition, in general eventually causing a large reduction in volume of normally up to 52% by volume. As a result of this, the first phase and the second phase, which are α-(Fe,Ni) phases, have diverse microstructures, such as crystals that are observed in precious stones such as quartz and minerals and rocks such as pyrite and aragonite, and these phases are in a reduced form on a nanoscale and contain various phases and nanocrystals with various Ni contents in their interior.

The structures seen at the grain boundaries and in intergrowths may also exhibit a difference in Ni content depending on the observed location, and hence are a heterogeneous phase interface in some cases. Therefore, if the orientation of the magnetic material crystals surrounded by these crystal boundaries is non-orientated within the ferromagnetic coupling length, coercive force is greatly reduced in accordance with the above-mentioned random magnetic anisotropy model, <Random Magnetic Anisotropy Model and Coercive Force Reduction Mechanism Unique to Present Invention>

For the soft magnetic material of the present invention described by the random anisotropy model, it is important that the following three conditions are satisfied.
(1) Crystal grain size of the α-(Fe,Ni) phase is small.
(2) There is ferromagnetic coupling by exchange interaction.
(3) There is random orientation.

Item (3) is not always necessary, and even in the absence of random orientation, the reduction in coercive force can occur based on a different principle from that of the random anisotropy model. Specifically, magnetic anisotropy fluctuations occur based on concentration fluctuations in the nanoscale Ni component content due to interactions between any one or more of the first phase and the second phase, the first phases themselves, or the second phases themselves. This promotes magnetization reversal, and the coercive force is reduced. The magnetization reversal mechanism based on this mechanism is unique to the present invention, and has been found for the first time by the present inventors as far as the inventors are aware.

In cases of the grain growth during reduction, or where the grains do not fuse with each other so as to form a continuous ferromagnetic phase, or where there is phase separation in which grains separate, to bring the coercive force of the magnetic material powder of the present invention into the soft magnetic region, it is desirable to subsequently solidify the magnetic material by sintering or the like, namely, form the state that "the first phase and the second phase are continuously bonded to each other directly or via a metal phase or an inorganic phase to form a massive state as a whole".

In order to achieve the above item (2), namely, ferromagnetic coupling by exchange interaction, since the exchange interaction is an interaction or force that acts within a short range in the order of several nm, when first phases are coupled to each other, it is necessary for the phases are to be directly bonded, and when a first phase and a second phase or second phases are coupled to each other, it is necessary for the second phase to be ferromagnetic or antiferromagnetic in order to transmit the exchange interaction. Even if a part of the first phase and/or the second phase is in a superparamagnetic region, since the material itself is ferromagnetic or antiferromagnetic in the bulk state, as long as the surrounding ferromagnetic or antiferromagnetic phase is sufficiently exchange coupled, those phases may be able to transmit an exchange interaction.

The reason why the magnetic material of the present invention has the above characteristics is that the present invention mainly provides a build-up type bulk magnetic material by producing a magnetic material that has a high magnetization and that is formed by a method which is essentially different from other metallic soft magnetic materials for high frequency applications, namely, by first producing a metal powder having nanocrystals by reducing a nickel ferrite nanopowder and then forming a solid magnetic material by molding the magnetic powder.

<Average Crystal Grain Size of First Phase, Second Phase, and Whole Magnetic Material>

The average crystal grain size of the first phase or the second phase of the soft magnetic material of the present invention or the average crystal grain size of the whole magnetic material is preferably less than 10 μm, and more preferably is in the nano region. When the average crystal grain size of the first phase and the second phase is in the nano region, the average crystal grain size of the whole magnetic material is in the nano region.

In particular, regarding the soft magnetic material of the present invention, in order to realize a low coercive force by the above random magnetic anisotropy model or the mechanism unique to the present invention, it is preferable that either the first phase or the second phase is in the nano region. When both the first phase and the second phase are ferromagnetic phases, it is preferable that the average crystal grain size of both phases is less than 10 μm, and preferably less than 1 μm in order to realize a low coercive force based on the random magnetic anisotropy model. This average crystal grain size is more preferably 500 nm or less, and particularly preferably 200 nm or less, because a remarkable reduction effect of the coercive force by the mechanism unique to the present invention can be realized, although this does depend on the M content as well. In the above case, since the magnetic anisotropy energy of the first phase is larger than the second phase in many cases, particularly when the first phase is less than 10 μm, preferably 500 nm or less, and more preferably 200 nm or less, the coercive force becomes very small, and a soft magnetic material suitable for various transformers, motors, and the like is obtained.

On the other hand, if this average crystal grain size is less than 1 nm, superparamagnetism occurs at room temperature, and magnetization and permeability may become extremely small. Therefore, it is preferable that this average crystal grain size is 1 nm or more. As mentioned above, if crystal grains smaller than 1 nm or amorphous phases are present, these need to be sufficiently coupled to crystal grains of 1 nm or more in size by exchange interaction.

When the second phase is not a ferromagnetic phase, the second phase is not involved in reducing the coercive force by the random anisotropy model, but its presence increases the electric resistivity, and hence it is preferable for that component to be present.

In the case of the semi-hard magnetic material of the present invention, in order to express a coercive force, contrary to the above, it is effective to maintain the average crystal grain size of the first phase at the nano level, and either employ a suitable surface oxide layer as the second phase or cause a second phase having an average crystal grain size of several nm to be present at the grain boundary of the first phase to thereby maintain a high magnetization and impart oxidation resistance while maintaining the coercive force of the semi-hard magnetic region.

<Measurement of Crystal Grain Size>

Measurement of the crystal grain size of the present invention is carried out using an image obtained by SEM, TEM, or metallographic microscopy. The crystal grain size is obtained by, within an observed range, observing not only the heterogenous phase interfaces and crystal grain boundaries but all the crystal boundaries, and taking the diameter of the crystal region of the surrounded portion to be the crystal grain size. When the crystal boundary is difficult to see, the crystal boundary may be etched by a wet method using a Nital solution or the like, a dry etching method, or the like. The average crystal grain size is, in principle, obtained by selecting a representative portion and measuring a region containing at least 100 crystal grains. Although the number of grains may be less than this, in that case the measurement needs to be carried out on a portion that is statistically sufficiently representative of the whole. The average crystal grain size is obtained by photographing the observation area, defining an appropriate rectangular quadrilateral area on the photographic plane (the enlarged projection plane on the target photographic plane), and applying the Jeffry method to the interior of that defined area. When observing by an SEM or a metallurgical microscope, the crystal boundary width may be too small in relation to the resolution and may not be observed, but in that case the measured value of the average crystal grain size gives the upper limit of the actual crystal grain size. Specifically, there is no problem as long as the average crystal grain size measurement value has an upper limit of 10 μm. However, there is a possibility that part or all of the magnetic material may be below 1 nm, which is the lower limit of the crystal grain size, due to phenomena such as having no clear diffraction peaks in XRD and superparamagnetism being confirmed on the magnetic curve. In such a case, the actual crystal grain size must be determined again by TEM observation.

<Measurement of Crystallite Size>

In the present invention, phase separation occurs due to the disproportionation reaction, and a composition width occurs in the Ni content of the bcc phase of the first phase and/or the second phase. However, since in principle the X-ray diffraction line peak positions vary depending on the Ni content, even if the line width of the (200) diffraction line of the bcc phase is calculated, for example, this is fairly meaningless in terms of determining the crystallite size Here, the term "crystallite" refers to a small single crystal at the microscopic level forming the crystal substance, which is smaller than the individual crystals (so-called crystal grains) forming the polycrystal.

However, Ni has an atomic radius close to that of Fe (the atomic radii of Fe and Ni are 0.124 nm and 0.125 nm), and when limited to the magnetic material of the present invention, there is little change seen in crystallite size due to the influence of the composition distribution. Therefore, as in the present invention, the value of the crystallite size of the crystals obtained by the above method (e.g., crystals having a bcc phase represented by a composition in which at least the first phase is represented by the composition formula $Fe_{100-x}Ni_x$ (where x is $0.001 \leq x \leq 30$ in terms of atomic percentage)) is significant.

In the present invention, the crystallite size of the bcc phase was calculated by using the (200) diffraction line width excluding the influence of the $K\alpha_2$ diffraction line and the Scherrer equation, and taking the dimensionless shape factor to 0.9.

The bcc phase may be a phase in which at least the first phase has the bcc phase (i.e., a case in which only the first phase has the bcc phase and a case in which both the first phase and the second phase have the bcc phase), but a preferable crystallite size range of the bcc phase is 1 nm or more and less than 100 nm.

When the crystallite size is less than 1 nm, superparamagnetism occurs at room temperature, and magnetization and permeability may become extremely small. Therefore, it is preferable that this crystallite size is 1 nm or more.

The crystallite size of the bcc phase is preferably less than 100 nm because the coercive force enters the soft magnetic region and becomes extremely small, and a soft magnetic material suitable for various transformers, motors, and the like is obtained. Further, at 50 nm or less, not only a high magnetization exceeding 2 T, which is a low region of the Ni content, can be obtained, but also a low coercive force can be achieved at the same time, and hence this is a very preferable range.

<Size of Soft Magnetic Material>

The size of the powder of the soft magnetic material of the present invention (average powder particle diameter) is preferably 10 nm or more and 5 mm or less. If this size is less than 10 nm, the coercive force does not become sufficiently small, and if the size exceeds 5 mm, a large strain is applied during sintering, and the coercive force conversely increases unless there is an annealing treatment after solidification. More preferably the size is 100 nm or more and 1 mm or less, and particularly preferably is 0.5 µm or more and 500 µm or less. If the average powder particle diameter is contained in this region, a soft magnetic material with a low coercive force is obtained. In addition, the particle size distribution is preferably sufficiently wide within each average powder particle diameter range defined above because high filling is easily achieved with a relatively small pressure and the magnetization based on the volume of the solidified molded body is increased. When the powder particle diameter is too large, movement of the domain walls may be excited, and due to the heterogenous phases formed by the disproportionation reaction in the production process of the soft magnetic material of the present invention, that domain wall movement is hindered, which can conversely result in the coercive force becoming larger. Therefore, when molding the soft magnetic material of the present invention, it can be better for the surface of the magnetic material powder of the present invention having an appropriate powder particle diameter to be in an oxidized state. Since the alloy containing an M component may form a passive film of a nonmagnetic M-component oxide phase on the surface by oxidation, not only is oxidation resistance extremely excellent, but there is also an effect of reducing the coercive force and improving in electrical resistivity. Performing appropriate gradual oxidation of the powder surface, carrying out each step in air, and performing the solidification treatment in an inert gas atmosphere or the like rather than only in a reducing atmosphere are also effective.

<Size of Semi-Hard Magnetic Material>

The magnetic powder of the semi-hard magnetic material of the present invention is preferably in a range of 10 nm or more and 10 µm or less. If this average powder particle diameter is less than 10 nm, molding is hard to carry out, and when the magnetic material is used dispersed in a synthetic resin or ceramic, dispersibility is very poor. In addition, if the powder particle diameter exceeds 10 µm, since the coercive force may reach the soft magnetic region, and in such cases the magnetic material falls into the category of a soft magnetic material of the present invention. A more preferable powder particle diameter is 10 nm or more and 1 µm or less, Within this range, the magnetic material is a semi-hard magnetic material with an excellent balance between saturation magnetization and coercive force.

<Measurement of Average Powder Particle Diameter>

The powder particle diameter of the magnetic material of the present invention is mainly evaluated based on its median diameter calculated from a distribution curve obtained by measuring the volume-equivalent diameter distribution using a laser diffraction type particle size distribution meter. Alternatively, the powder particle diameter may also be calculated by choosing a photograph of the powder obtained by SEM or TEM, or a representative portion based on a metallographic micrograph, measuring the diameter of at least 100 particles, and volume-averaging the diameters of those particles. Although the number of particles may be less than this, in that case the measurement needs to be carried out on a portion that is statistically sufficiently representative of the whole. In particular, when measuring the particle size of a powder smaller than 500 nm or a powder exceeding 1 mm, priority is given to a method using SEM or TEM. In addition, when a total number of measurements n is performed using N types ($N \leq 2$) of measurement method or measurement apparatus in combination ($N \leq n$), the numerical values $R_n$ thereof needs to be within a range of $R/2 \leq R_n \leq 2R$. In that case, the powder particle diameter is determined based on R, which is the geometric average of the lower limit and the upper limit.

As described above, in principle, the powder particle diameter of the magnetic material of the present invention is measured by (1) when the measurement value is 500 nm or more and 1 mm or less, preferentially using the laser diffraction type particle size distribution meter, (2) when the measurement value is less than 500 nm or more than 1 mm, preferentially using microscopy, and (3) when the measurement value is 500 nm or more and 1 mm and methods (1) and (2) are to be combined, calculating the average powder particle diameter by using the above-mentioned R. In the present application, the powder particle diameter is expressed to one to two significant digits in the case of methods (1) or (2), and in the case of (3) is expressed to one significant digit. The reason why the methods for measuring the powder panicle diameter are used together is that when the powder particle diameter is just above 500 nm or just below 1 mm, there is a possibility that with method (1) an inaccurate value is obtained even when expressed to one significant digit, while on the other hand, for method (2), it takes time and effort to confirm that the measurement value is not local information. Therefore, it is very rational to first obtain the value of the average powder particle diameter by method (1), then obtain the value easily by method (2), comparatively look at the two values and determine the average powder particle diameter by using the above-mentioned R. In the present application, the average particle diameter of the powder of the magnetic material of the present invention is determined by the above method. However, if methods (1) and (3), or methods (2) and (3) do not match to one significant digit, R must be determined by precisely measuring using method (1) or (2) again based on the average powder particle diameter range. However, when there are obvious inappropriate reasons, such as when there is clearly strong agglomeration and it would be inappropriate to determine the powder particle diameter by method (1), or when the powder is too uneven and the powder particle diameter estimated from the sample image is clearly different and it would be inappropriate to determine the powder particle diameter by method (2), or when due to the specification of the measurement apparatus, classifying based on a size of 500 nm or 1 mm as the standard for determining the powder particle diameter measurement would be inappropriate, it is acceptable to disregard the above principle and re-select one of the methods (1), (2) or (3) for that particular case. Specifically, within the scope of the measurement methods (1) to (3), the most appropriate method for obtaining the volume average value of the powder particle diameter as close as possible to the true value may be selected by grasping capturing the true form of the magnetic material. If it is only necessary to distinguish the magnetic material of the present invention from other magnetic materials, it is sufficient for the average powder particle diameter to be determined to one significant digit.

For example, in the case of reducing a nickel ferrite nanopowder having a Ni content of 10 atom % or less at 1100° C. or more, the macroscopic powder shape is a three-dimensional network structure in which many hollow portions, which are through-holes, are contained inside, and hence the powder may become sponge-like. These hollow portions are thought to be formed by large volume reductions caused by oxygen leaving the crystal lattice as grain growth progresses in the reduction reaction. The powder particle diameter in this case is measured including the volume of the interior hollow portions.

<Solid Magnetic Material>

The magnetic material of the present invention can be used as a magnetic material in which the first phase and the second phase are continuously bonded to each other directly or via a metal phase or an inorganic phase to form a massive structure as a whole (in the present application, also referred to as "solid magnetic material"). Further, as described above, when many nanocrystals are already bonded in the powder, the powder may be molded by mixing with an organic compound such as a resin, an inorganic compound such as glass or ceramic, a composite material thereof or the like.

<Packing Factor>

The packing factor is not particularly limited as long as the objects of the present invention can be achieved. However, when the magnetic material of the present invention contains a small amount of the Ni component, from the perspective of a balance between oxidation resistance and magnetization level, it is preferable to set the packing factor to 60% by volume or more and 100% by volume or less.

As used herein, the term "packing factor" refers to the ratio, expressed as a percentage, of the volume of the magnetic material of the present invention relative to the volume of the whole magnetic material of the present invention including voids (i.e., volume occupied only by the magnetic material of the present invention, excluding the portion that is not the magnetic material of the present invention, such as voids and resin).

A more preferable range of the packing factor is 80% or more, and particularly preferable is 90% or more. Although the magnetic material of the present invention has high oxidation resistance to begin with, as the packing factor is increased, the oxidation resistance further increases, and there is a wider range of applications that the magnetic material of the present invention can be applied to. In addition, the saturation magnetization is also improved, and a high performance magnetic material can be obtained. Further, in the soft magnetic material of the present invention, there is also an effect of increasing the bonding between the powders and reducing the coercive force.

<Characteristics of Magnetic Powder and Solid Magnetic Material of Present Invention>

One of the major characteristics of the magnetic material powder of the present invention is that it is a sinterable powder material like ferrite. Various solid magnetic materials having a thickness of 0.5 mm or more can easily be produced. Even various solid magnetic materials having a thickness of 1 mm or more, and even 5 mm or more, can be produced comparatively easily by sintering or the like as long as the thickness is 10 cm or less. When the solid magnetic material of the present invention is to be applied as a soft magnetic material, the solid magnetic material may be used in a wide variety of shapes in accordance with the application.

The solid magnetic material of the present invention does not contain a binder such as a resin, has high density, and can be easily processed into an arbitrary shape by an ordinary processing machine by cutting and/or plastic working. In particular, one of the major characteristics of the solid magnetic material is that it can be easily processed into a prismatic shape, a cylindrical shape, a ring shape, a disk shape, a flat sheet shape or the like having high industrial utility value. It is also possible to process the solid magnetic material into those shapes and then subject to cutting and the like for processing into a roof tile shape or a prismatic shape having an arbitrary base shape. Specifically, it is possible to easily perform cutting and/or plastic working into an arbitrary shape or any form surrounded by flat surfaces or curved surfaces, including cylindrical surfaces. Here, the term "cutting" refers to cutting general metal materials. Examples include machine processing by a saw, a lathe, a milling machine, a drilling machine, a grinding stone, and the like. The term "plastic working" refers to a process such as die cutting by a press, molding, rolling, explosion forming, and the like. Further, in order to remove distortion after cold working; annealing can be performed at the ordinary temperature to 1290° C.

<Production Method>

Next, the method for producing the magnetic material of the present invention will be described, but the present invention is not particularly limited thereto. The method for producing the magnetic material of the present invention comprises:

(1) a nickel ferrite nanopowder production step; and (2) a reduction step, and may optionally further comprise any one or more of the following steps:

(3) a gradual oxidation step;
(4) a molding step; and
(5) an annealing step.

Each step is now described in more detail.

(1) Nickel Ferrite Nanopowder Production Step (in the Present Application, Also Referred to as "Step (1)")

Examples of a preferable step of producing the nanomagnetic powder, which is a raw material of the magnetic material of the present invention, include a method of synthesizing at room temperature using a wet synthesis method.

Examples of known methods for producing a ferrite fine powder include a dry bead mill method, a dry jet mill method, a plasma jet method, an arc method, an ultrasonic spray method, an iron carbonyl vapor phase cracking, and the like. Any of these methods is a preferable production method, as long as the magnetic material of the present invention is formed. However, to obtain nanocrystals having a disproportionated composition, which is the essence of the present invention, it is preferable to mainly employ a wet method using an aqueous solution because it is the simplest.

This production step is carried out by applying the "ferrite plating method" described in Patent Document 3 to the step for producing the nickel ferrite nanopowder used for producing the magnetic material of the present invention. The ordinary "ferrite plating method" is applied not only to powder surface plating but also to thin films and the like. The reaction mechanism and the like of the ferrite plating method have already been disclosed (e.g., see Masaki Abe, Journal of the Magnetics Society of Japan, Volume 22, No. 9 (1998), page 1225 (hereinafter, referred to as "Non Patent Document 4") and "WO 2003/015109 A1" (hereinafter, referred to as "Patent Document 4")). However, unlike such a "ferrite plating method", in this production step, the powder surface, which serves as the base material of the plating, is not used. In this production step, the raw materials (e.g., nickel chloride and iron chloride) used for ferrite plating are reacted in solution at 100° C. or less to directly synthesize the ferrous and crystalline nickel ferrite nanopowder itself in the present application, this step (or method) is referred to as "nickel ferrite nanopowder production step" (or "nickel ferrite nanopowder production method").

A "nickel ferrite nanopowder production step" in which the nanopowder has a spinel structure is described below as an example.

An appropriate amount of an aqueous solution adjusted in advance to an acidic region is placed in a container (in the present application, also referred to as a "reaction field"), and while subjecting to ultrasonic wave excitation at room temperature under atmospheric pressure or mechanical stirring at an appropriate strength or revolution number, a pH adjusting solution is added dropwise simultaneously with a reaction solution to gradually change the pH of the solution from the acidic to the alkaline range, thereby forming nickel ferrite nanoparticles in the reaction field. Then, the solution and the nickel ferrite nanopowder are separated, and the powder is dried to obtain a nickel ferrite powder having an average powder particle diameter of 1 nm or more to less than 1 μm. The above method is an example of an inexpensive method because the steps are simple. In particular, all of the steps in the working examples of the present invention are carried out at room temperature, and hence the burden of equipment costs and running costs in production steps is reduced due to the use of production step that do not use a heat source. Although the method for producing the nickel ferrite nanopowder used in the present invention is of course not limited to the above-mentioned production method, the initial liquid used in the above production method of the reaction field before the reaction starts (in the present application, this is also referred to as the "reaction field solution"), the reaction solution, and the pH adjusting solution are now described in more detail below.

As the reaction field solution, an acidic solution is preferable. In addition to inorganic acids such as hydrochloric acid, nitric acid, sulfuric acid, and phosphoric acid, a solution obtained by dissolving a metal salt, a double salt thereof, a complex salt solution, and the like in a hydrophilic solvent such as water (e.g., an iron chloride solution, a nickel chloride solution, etc.), a solution of a hydrophilic solvent such as an aqueous solution of an organic acid (e.g., acetic acid, oxalic acid, etc.), and combinations thereof, may be used. As the reaction field solution, preparing the reaction solution in advance in the reaction field is effective for efficiently promoting the synthesis reaction of the nickel ferrite nanopowder. If the pH is less than −1, the material providing the reaction field is restricted, and avoidable impurities may become mixed in the solution. Therefore, it is desirable to control the pH to between −1 or more and less than 7. To increase the reaction efficiency in the reaction field and minimize elution and precipitation of unnecessary impurities, a particularly preferable pH range is 0 or more and less than 7. As a pH range that provides a good balance between reaction efficiency and yield, the pH is more preferably 1 or more and less than 6.5. Although hydrophilic solvents among organic solvents and the like can be used as the solvent in the reaction field, it is preferable that water is contained so that the inorganic salt can be sufficiently ionized.

The reaction solution may be a solution of an inorganic salt in water as a main component, such as a chloride such as iron chloride or nickel chloride, a nitrate such as iron nitrate, or a nitrite, a sulfate, a phosphate, or a fluoride containing an Fe component and/or a. Ni component (optionally also containing an M component), in some cases, a solution mainly comprising a hydrophilic solvent, such as organic acid salt in water may also be used as required. Also, a combination thereof may be used. It is essential that reaction solution contain iron ions and nickel ions. Regarding the iron ions, the reaction solution may contain only divalent iron ($Fe^{2+}$) ions, a mixture with trivalent iron ($Fe^{3+}$) ions, or only trivalent iron ions. In the case of containing only $Fe^{3+}$ ions, it is necessary to contain metal ions of the M component element that are divalent or less. Known examples of the valence of the Ni ions are monovalent, divalent, and trivalent, but divalent is best in terms of the homogeneity of the reaction in the reaction solution or reaction field solution.

Examples of the pH adjusting solution include an alkaline solution such as sodium hydroxide, potassium hydroxide, sodium carbonate, sodium hydrogencarbonate, and ammonium hydroxide, an acidic solution such as hydrochloric acid, and combinations thereof. It is also possible to use a pH buffer such as an acetic acid-sodium acetate mixed solution, or to add a chelate compound or the like.

Although the oxidizing agent is not indispensable, it is an essential component when only $Fe^{2+}$ ions are contained as Fe ions in the reaction field solution or the reaction solution. Examples of the oxidizing agent include nitrites, nitrates, hydrogen peroxide, chlorates, perchloric acid, hypochlorous acid, bromates, organic peroxides, dissolved oxygen water, and the like, and combinations thereof. Stirring in air or in an atmosphere having a controlled oxygen concentration is effective in maintaining a situation in which dissolved oxygen acting as an oxidizing agent is continuously supplied to the nickel ferrite nanoparticle reaction field, and to control the reaction. In addition, by continuously or temporarily introducing an inert gas such as nitrogen gas or argon gas by bubbling into the reaction field, for example, to limit the oxidizing action of oxygen, the reaction can be stably controlled without inhibiting the effect of other oxidizing agents.

In a typical nickel ferrite nanopowder production method, formation of the nickel ferrite nanoparticles proceeds by the following reaction mechanism. The nuclei of the nickel ferrite nanoparticles are produced in the reaction solution directly or via an intermediate product such as green rust. The reaction solution contains $Fe^{2+}$ ions, which are adsorbed on powder nuclei already formed or on OH groups on the powder surface that have grown to a certain extent, thereby releasing $H_+$. Subsequently, when an oxidation reaction is performed by oxygen in the air, an oxidizing agent, an anode current ($e^+$), or the like, a part of the adsorbed $Fe^{2+}$ ions is oxidized to $Fe^{3+}$ ions. While the $Fe^{2+}$ ions, or the $Fe^{2+}$ and the $Ni^{2+}$ ions (or, Ni and M component ions), in the solution are again adsorbed on the already adsorbed metal ions, $H^+$ ions are released in conjunction with hydrolysis, whereby a ferrite phase having a spinel structure is formed. Since OH groups are present on the surface of the ferrite phase, metal ions are again adsorbed and the same process is repeated to thereby grow into nickel ferrite nanoparticles.

Among these reaction mechanisms, to directly change from $Fe^{2+}$ and $Ni^{2+}$ to the ferrite having a spinel structure, the reaction system may be, while adjusting the pH and the redox potential so as to cross the line dividing the $Fe^{2+}$ ions and ferrite on the equilibrium curve in the pH-potential diagram of Fe, (slowly) shifted from the stable region of $Fe^{2+}$ ions to the region where ferrite precipitates. $Ni^{2+}$ is, except for special cases, a divalent state from the early stage of the reaction, and has almost no influence on redox potential change. In many cases, reactions due to a change in the redox potential of Fe (i.e., progress from the mixed solution to the ferrite solid phase) are described. When ions of the M component element are contained and the oxidation number of those ions changes and participates in the reaction, the same argument can be made by using or predicting a pH-potential diagram corresponding to the composition and the temperature. Therefore, it is desirable to produce a ferrite phase while appropriately adjusting conditions such as the kind, concentration, and addition method of the pH adjusting agent and the oxidizing agent.

In most generally well-known ferrite nanopowder production methods, the reaction solution is prepared on the acidic side, the alkali solution is added in one go to set the reaction field to a basic region, and fine particles are instantaneously formed by coprecipitation. It may be thought that consideration is given such that differences in the solubility product between the Fe component and the Ni component do not cause non-uniformity. Of course, the ferrite nanopowder may be prepared by such a method and very small nanoparticles can be prepared, and hence such a ferrite nanopowder can be used as the ferrite raw material for the magnetic material of the present invention.

On the other hand, in the embodiment of the present invention, a step is designed such that, while dropping the reaction solution and supplying the raw materials for the nickel ferrite nanopowder production method to the reaction field, the Ni component is steadily incorporated into the Fe-ferrite structure by dropping the pH adjusting agent at the same time to gradually change the pH from acidic to basic. According to this step, at the stage of producing the nickel ferrite nanopowder the $H^+$ released when ferrite is produced by the above-mentioned mechanism is neutralized by the continuous introduction of the pH adjusting solution into the reaction field, and nickel ferrite particles are produced and grow one after another. Further, at the early stage of the reaction, there is a period in which green rust is produced and the reaction field becomes green. However, it is important that the Ni component is mixed into this green rust. When the green rust has finally been converted into ferrite, the Ni is incorporated into the lattice, and in the subsequent reduction reaction, in the first phase and the second phase, the Ni is incorporated into the $\alpha$-Fe phase having the bcc structure.

In addition to the above, other factors for controlling the reaction include stirring and reaction temperature.

Dispersion is very important to prevent the fine particles produced by the nickel ferrite nanopowder synthesis reaction from agglomerating and inhibiting a homogeneous reaction. To carry out such dispersion, any known method, or a combination thereof, may be used in accordance with the purpose of controlling the reaction, such as a method in which the reaction is subjected to excitation while simultaneously dispersing by ultrasonic waves, a method in which a dispersion solution is conveyed and circulated by a pump, a method of simply stirring by a stirring spring or a rotating drum, and a method of shaking or vibrating with an actuator or the like.

Generally, since the reaction in the nickel ferrite nanopowder production method used in the present invention is carried out in the presence of water, as the reaction temperature, a temperature between the freezing point and the boiling point of water under atmospheric pressure, namely, from 0° C. to 100° C., is selected.

In the present invention, a material produced from a method, e.g., a supercritical reaction method, for synthesizing nickel ferrite nanopowder in a temperature range exceeding 100° C. by placing the entire system under high pressure may be, as long as a nickel ferrite nanoparticles exhibiting the effects of the present invention can be formed, considered to be the magnetic material of the present invention.

As a method for exciting the reaction, in addition to the above-mentioned temperature and ultrasonic waves, pressure and photo excitation may also be effective.

Further, in the present invention, when applying a nickel ferrite nanopowder production method using an aqueous solution containing $Fe^{2+}$ as the reaction solution (particularly when reacting the nickel ferrite nanopowder under conditions in which the Fe is mixed as a divalent ion), if the Ni content is less than 40 atom % it is important that divalent ions of Fe are observed in the finally formed ferrite nanopowder of the magnetic material of the present invention. The amount of the divalent ions is, in terms of the ratio of $Fe^{2+}/Fe^{3+}$, preferably 0.001 or more. It is preferable to identify the divalent ions by using an electron beam microanalyzer (EPMA). Specifically, the surface of the manganese ferrite nanoparticles is analyzed by the EPMA to obtain an X-ray spectrum of $FeL_\alpha$-$FeL_\beta$, the difference between the two materials is taken, and the amount of $Fe^{2+}$ ions in the manganese ferrite nanoparticles can be identified by comparing with the spectrum of a standard sample of an iron oxide containing $Fe^{2+}$ (e.g., magnetite) and an iron oxide containing only $Fe^{3+}$ (e.g., hematite or maghemite).

At this time, the EPMA measurement conditions are an acceleration voltage of 7 kV, a measurement diameter of 50 µm, a beam current of 30 nA, and a measurement time of 1 sec/step.

Examples of representative impurity phases of the nickel ferrite nanopowder include oxides such as Ni-hematite, iron oxide hydroxides such as goethite, acagenite, lepidocrocite, feroxyhyte, ferrihydrite, and green rust, hydroxides such as potassium hydroxide and sodium hydroxide, and the like. Among these, particularly when containing a ferrihydrite phase and a Ni-hematite phase, since these form an α-(Fe, Ni) phase and other secondary phases after reduction, it is not always necessary to remove them. These ferrihydrite and Ni-hematite phases are observed in SEM observation and the like as a sheet-like structures having a thickness of several nm. However, since the particles have a large area relative to their thickness, these phases may promote large improper grain growth in the reduction reaction process, and since they also contain many impurities other than the Fe component, the Ni component, and oxygen, it is desirable that the volume fraction of these phases is less than that of the nickel ferrite nanopowder. In particular, when the atomic ratio of the Ni component relative to the Fe component is more than 0.33 and 0.5 or less, the Ni ratio of the phases other than the nickel ferrite nanopowder centered on ferrihydrite and Ni-hematite becomes larger than that of the nickel ferrite nanoparticles, and as a result, the disproportionation that occurs during reduction becomes difficult to control. Therefore, careful attention needs to be given to the degree of agglomeration of impurity phases such as a ferrihydrite phase and a Ni-ferrite phase (in particular, to prevent uneven distribution up to several microns). It is also noted that, irrespective of the above, the ferrihydrite phase and Ni-ferrite phase, which easily incorporate Ni, can be caused to coexist so as to prevent the above-mentioned inappropriate minor phases that do not contain Ni from precipitating by intentionally limiting the content of these phases based on the whole magnetic material to a range from 0.01% by volume or more to 33% by volume or less. When doing this, it is not necessary to strictly maintain the control conditions during production of the nickel ferrite nanopowder, and hence the industrial benefits are large.

The composition ratio of Fe and Ni in the nickel ferrite nanopowder, which is the raw material of the present invention, is not particularly limited as long as the object of the present invention can be achieved, but specifically the content of Ni relative to the total of Fe and Ni is preferably 0.01 atom % or more and 70 atom % or less, and the content of Ni relative to the total of Fe and Ni is more preferably 0.01 atom % or more and 50 atom % or less.

The average powder particle diameter of the nickel ferrite nanopowder used as a raw material of the present invention is preferably 1 nm or more and less than 1 μm. It is more preferably 1 nm or more and 100 nm. If this average powder particle diameter is 1 nm or less, the reaction during reduction cannot be sufficiently controlled, resulting in poor reproducibility. If this average powder particle diameter exceeds 100 nm, the improper grain growth of the metal component reduced in the reduction step is substantial, and in the case of the soft magnetic material, the coercive force may increase. Further, if the average powder particle diameter is 1 or more, the α-Fe phase separates, Ni is not incorporated into this phase, and a magnetic material having poor in terms of the excellent electromagnetic properties and oxidation resistance provided by the present invention may be only obtained.

When the nickel ferrite nanopowder used in the present invention is produced mainly in an aqueous solution, moisture is removed by decantation, centrifugation, filtration (in particular, suction filtration), membrane separation, distillation, vaporization, organic solvent exchange, solution separation by magnetic field recovery of the powder, or a combination thereof, and so on. The nickel ferrite nanopowder is then vacuum dried at ordinary temperature or a high temperature of 300° C. or less, or dried in air. The nickel ferrite nanopowder may also be hot-air dried in air or dried by heat treating in an inert gas such as argon gas, helium gas, or nitrogen gas (in the present invention, the nitrogen gas may not be an inert gas depending on the temperature range during heat treatment), or a reducing gas such as hydrogen gas, or a mixed thereof. Examples of a drying method that removes unnecessary components in the solution but does not use a heat source at all include a method in which, after the centrifugation, the supernatant is discarded, the nickel ferrite nanopowder is further dispersed in purified water, centrifugation is repeated, and finally the solvent is exchanged with a hydrophilic organic solvent having a low boiling point and a high vapor pressure, such as acetone, and then vacuum-dried under ordinary temperature.

(2) Reduction Step (in the Present Application, Also Referred to as "Step (2)")

This step is a step in which the nickel ferrite nanopowder produced by the above method is reduced to produce the magnetic material of the present invention.

Reducing in a gas phase is the most preferred method. Examples of the reducing atmosphere include hydrogen gas, an organic compound gas, such as carbon monoxide gas, ammonia gas, and formic acid gas, a mixed gas of such an organic compound gas and an inert gas, such as argon gas and helium gas, a low-temperature hydrogen plasma, supercooled atomic hydrogen, and the like. Examples of methods for carrying out the reduction step include a method in which these gases can be circulated in a horizontal or vertical tube furnace, a rotary reaction furnace, a closed reaction furnace, or the like, refluxed, hermetically closed, and heated with a heater, and methods in which heating is carried out by infrared rays, microwaves, laser light, and the like. The reaction may also be carried out in a continuous manner using a fluidized bed. Further, the reduction method such as the method for reducing with solid C (carbon) or Ca, the method for mixing with calcium chloride or the like and the method for reducing in an inert gas or a reducing gas, and as an industrial method, the method for reducing with Al, may be used. As long as the magnetic material of the present invention is obtained, any method falls within the scope of the production method of the present invention.

However, a preferred method for the production method of the present invention is a method in which the reduction is carried out in hydrogen gas or a mixed gas of hydrogen gas and an inert gas as the reducing gas. To produce the magnetic material of the present invention phase-separated at the nano-scale, the reducing power is too strong by reducing with C or Ca, and it becomes very difficult to control the reaction for forming the soft magnetic material of the present invention. In addition, there are problems such as generation of toxic CO after reduction and mixing of calcium oxide, which must be removed by washing with water. However, by reducing in hydrogen gas, the reduction treatment can be carried out under consistently clean conditions.

The oxygen content in the material of the present invention is generally determined by an inert gas-melting method, but when the oxygen content before reduction is known, the oxygen content in the material of the present invention can also be estimated from the weight difference before and after reduction. However, when there is simultaneously a large amount of a halogen element, such as chlorine, whose content tends to change before and after reduction, and an alkali element such as K or Na or a highly volatile component such as water or an organic component contained in the material, the content of each of these elements and components should be individually identified. This is because the oxygen content cannot be precisely estimated based only on the weight change before and after the reduction reaction.

Incidentally, among alkali metals derived from the raw materials, for example, K begins to dissipate from the magnetic material at 450° C. due to vaporization, and most of it is removed at 900° C. or above. Therefore, in the case of an alkali metal derived from the raw materials for which it is better to keep around in the early stage of the reduction reaction in order to utilize its catalytic action, but depending on the application is preferably not present at the product stage, that alkali metal can be ultimately appropriately removed to an acceptable range by appropriately selecting the reduction conditions. The final content range of the alkali metal such as K that can be easily removed while having a positive effect on reduction is a lower limit value of 0.0001 atom % or more and an upper limit value of 5 atom % or less. This upper limit value can be further controlled to 1 atom % or less, and when most precisely controlled, to 0.01 atom %. Of course, based on the reduction conditions, it is also possible to reduce the alkali metal such as K further below the detection limit. Halogen elements such as Cl (chlorine) remaining in the nickel ferrite nanopowder are mainly released outside the material system as hydrogen halides such as HCl under the reducing atmosphere. The amount of remaining Cl and the like starts to substantially decrease at a reduction temperature of 450° C. or more, and although it depends on the Ni and K contents and the content change thereof during the reduction step, if a reduction temperature of approximately 700° C. or higher is selected, almost all of those halogen elements can be completely removed from inside the material.

The weight reduction before and after the reduction reaction of the present invention, which is mainly due to the O component being converted into $H_2O$ and evaporating depends on the Ni content, the M component content, the oxygen amount, the minor phase content, amount of impurities, amount of volatilized components such as water, the reducing reaction conditions such as the reducing gas species, and the like, but is usually between 0.1% by mass or more and 80% by mass or less based on the weight before the reduction reaction of 100% by mass.

Incidentally, as described in some of the Examples of the present invention, a local oxygen content may be determined based on a photograph from an SEM and the like or by EDX, and a phase identified by XRD or the like may be specified on a microscopic observation image. This method is suitable for roughly estimating the oxygen content and its distribution in each phase of the first phase and the second phase.

Hereinafter, a method for producing the magnetic material of the present invention by a heat treatment in a reducing gas is described in detail. The heat treatment in a typical reduction step is carried out by increasing the temperature of the material linearly or exponentially from room temperature to a constant temperature in a reducing gas flow at one or more temperature increasing rates, and then immediately decreasing the temperature linearly or exponentially to room temperature using one or more temperature decreasing rates, or maintaining the temperature for a fixed period (=reduction time) when increasing or decreasing the temperature during the temperature increasing/decreasing process or after the temperature has been increased (hereinafter, referred to as "constant temperature holding process"). Unless stated otherwise, the reduction temperature of the present invention refers to the highest temperature among the temperature at the time of switching from the temperature increasing process to the temperature decreasing process and the temperature during the process of maintaining the temperature for a fixed period.

When a method in which the nickel ferrite is reduced by hydrogen gas is selected as the production method of the soft magnetic material of the present invention, the reduction temperature may be set to 400° C. or more and 1538° C. or less, although this depends on the Ni content. Among this, it is preferable to select a temperature range in which the reduction temperature is 400° C. or more and 1425° C. or less. In general, this is because when the reduction temperature is less than 400° C., the reduction rate is very slow, the reduction time is prolonged, and productivity deteriorates. Further, when it is desired to reduce the reduction time to one hour or less, it is preferable to set the lower limit of the reduction temperature to 500° C. or more.

When performing reduction at 1230° C. or more and 1538° C. or less, depending on the Ni content, the magnetic material being reduced may melt. Therefore, generally if the Ni content is in the range of 0.01 to 33 atom %, the reduction treatment can be carried out by freely selecting the temperature range of approximately 400° C. or more and 1425° C. or less. However, when the Ni content exceeds 33 Atom % and is up to 50 atom %, it is preferable to carry out the reduction treatment by selecting a temperature of 400° C. or more and 1230° C. or less.

A characteristic of the method for producing the magnetic material of the present invention is that since Ni is reduced to a metal state according to the method of the present invention, performing the reduction reaction at the melting point or above, or at just below the melting temperature, may lead to coarsening of the microstructure, or the Ni reacting with a reactor such as a ceramic container. From this perspective, it is preferable not to set the reduction temperature to a temperature that is around or above the melting point. Depending on the coexisting M component, it is generally desirable not to select a temperature higher than 1538° C. as the reduction temperature.

From the above, the preferable reduction temperature range for the magnetic material of the present invention, which is a range in which the reduction time is short, the productivity is high, and the magnetic material does not melt, is 400° C. or more and 1425° C. or less regardless of the Ni content. However, by controlling the reduction temperature to within a range of 800° C. or more and 1230° C. or less, it is possible to obtain the soft magnetic material of the present invention having an even smaller coercive force. Therefore, this temperature range is particularly preferable in the present invention for producing a soft magnetic material having high magnetic properties.

When reduction is performed at the same temperature, the reduction reaction progresses as the reduction time increases. Therefore, the saturation magnetization increases as the reduction time is longer, but for coercive force, even if the reduction time is increased or the reduction temperature is increased, the coercive force does not necessarily decrease. It is desirable to appropriately select: the reduction time according to the desired magnetic properties.

Accordingly, when a method in which the nickel ferrite is reduced by hydrogen gas is selected as the production method of the magnetic material of the present invention, a preferable reduction temperature range is 400° C. or more and 1425° C. or less. Among this, in terms of obtaining a nickel ferrite powder having an average powder grain size of 1 nm or more and less than 1 μm, a reduction temperature range of 450° C. or more and 1425° C. or less is more preferable.

The grains of the nickel ferrite nanoparticles grow as reduction progresses. However, during that process, the crystal structure and the Ni content of the first phase and the second phase, which are the formed crystal trachts, change in various ways depending on the reduction temperature due to the Ni content of the original nickel ferrite nanoparticles.

Therefore, the composition of the crystal trachts changes depending on the rate of temperature increase during the increasing temperature process and the temperature distribution in the reaction furnace.

It is desirable that the magnetic material of the present invention is separated into the first phase and the second phase at the nanoscale in the reduction step during production of the magnetic material. Particularly in the case of the soft magnetic material of the present invention, it is desirable for the phases having the various Ni contents and crystal structures to be separated by the disproportionation reaction, and for the orientation of those phases to be random and/or for the phases to include concentration fluctuations in Ni content at the nanoscale and for each of the crystalline phases to be ferromagnetically coupled.

When the ferrite nanopowder of the present invention is reduced in hydrogen, a phase separation phenomenon due to the disproportionation reaction very frequently occurs via the increasing temperature process, constant temperature maintenance process, and temperature decreasing process, and during this period a wide variety of phases having various compositions appear, whereby the magnetic material of the present invention is formed. In particular, aggregates of nano-order crystallites are integrated by ferromagnetic coupling so that the direction of the crystallographic axes is isotropic and/or there are concentration fluctuations, and when the crystal magnetic anisotropy mainly due to random magnetic anisotropy is averaged, an excellent soft magnetic material of the present invention is formed.

In the present invention, the reason why appropriate grain growth occurs while maintaining a nano-microstructure even in a high temperature region exceeding 800° C. is unknown. However, the raw material is a nickel ferrite nanopowder, and even if this is reduced by hydrogen to a metallic state like the first phase, as long as appropriate reduction conditions are selected, the original grain shape and composition distribution are not reflected whatsoever in the microstructure, the structure has a uniform composition distribution, and there is no improper grain growth like a coarsening of the crystal grain size. Since this grain growth occurs together with the reduction reaction, and considering that the volume reduction due to reduction is normally up to 52% by volume, it can be easily inferred that disproportionation progresses while leaving structures similar to intergrowths and skeleton crystals. Further, it is also thought that, while the difference in reduction rates of the phases separated by disproportionation at the initial stage of the reduction reaction is also involved, nanoscale very fine disproportionated structures are ultimately formed as a whole due to the phase separation caused by the disproportionation reaction during the temperature decreasing process mainly occurring in the α-(Fe,Ni) phase, causing nanoparticles and nanostructures to precipitate even from the high-temperature phases homogenized to a certain extent, which have a size in the nano region while maintaining their is nano-microstructure. It is known that in the oxide phase containing Ni, such as the Ni-ferrite phase, wustite phase, the reduction rate tends to be faster as the Ni content is higher, and hence it is considered that once disproportionation occurs, the fact that the reduction reaction rate becomes uneven within the material acts in a beneficial manner to maintain the nanostructure.

The above series of observations is also supported by the fact that the magnetic material of the present invention should lose its characteristics if it melts.

(3) Gradual Oxidation Step (in the Present Application, Also Referred to as "Step (3)")

Since the magnetic material of the present invention after the reduction step contains nano metal particles, there is a possibility that the material may spontaneously ignite and combust if directly exposed to the air. Therefore, although it is not an essential step, it is preferable to subject the magnetic material of the present invention to a gradual oxidation treatment immediately after the reduction reaction is finished, as necessary.

The term "gradual oxidation" refers to suppressing rapid oxidation by oxidizing and passivating the surface of the reduced nano metal particles (providing a surface oxide layer of wustite, Ni-ferrite, etc.). The gradual oxidation is carried out, for example, in a gas containing an oxygen source, such as oxygen gas, in the vicinity of ordinary temperature to 500° C. or less, but in many cases a mixed gas containing an inert gas with an oxygen partial pressure lower than atmospheric pressure is used. If the temperature exceeds 500° C., it becomes difficult to control and provide a thin oxide film of a few run on the surface, no matter which low oxygen partial pressure gas is used. There is also a gradual oxidation method in which a vacuum is produced in a reactor, and then gradually released at ordinary temperature to increase the oxygen concentration so that the reactor is not abruptly brought into contact with the air.

In the present application, a step including an operation such as the above is referred to as the "gradual oxidation step". After this step, handling in the molding step, which is the next step, becomes very simple.

Examples of a method for again removing the oxide film after this step include a method in which the molding step is carried out under a reducing atmosphere, such as hydrogen gas. However, since the surface oxidation reaction in the gradual oxidation step is not a completely reversible reaction, it is impossible to remove all of the surface oxide film.

Of course, when the handling from the reduction step to the molding step is carried out by an apparatus devised so that it can be operated in an oxygen-free state like a glove box, this gradual oxidation step is unnecessary.

In contrast, when forming the soft magnetic material of the present invention having a sufficient size, it is also effective to actively utilize the gradual oxidation step to improve the oxidation resistance with an oxide film still formed on the surface of each powder, improve the electrical resistivity, as well as to stabilize the coercive force.

Further, in the case of the magnetic material powder of the present invention, which has a large Ni content, a sufficiently high reduction temperature and sufficiently long reduction time, and has undergone grain growth, even if this magnetic material is exposed to the air without being subjected to this gradual oxidation step, stable passivated films may be formed, and in such a case, a special gradual oxidation step is not required. In that case, exposing the magnetic material to the air can per se be regarded as a gradual oxidation step.

When oxidation resistance and magnetic stability are secured by gradual oxidation, ferromagnetic coupling may be broken by the oxide layer or the layer of the passivated film, and hence it is preferable to perform the gradual oxidation after grain growth has occurred as much as possible. Otherwise, as described above, it is preferable to not carry out the gradual oxidation step, and carry out the next molding step. It is desirable to then continue the reduction step and the molding step by deoxidation or a low oxygen process.

(4) Molding Step (in the Present Application, Also Referred to as "Step (4)")

The magnetic material of the present invention is used as a magnetic material (i.e., a solid magnetic material) in which the first phase and the second phase are continuously bonded to each other directly or via a metal phase or an inorganic phase to form a massive state as a whole. The magnetic material powder of the present invention is used in various applications by solidifying the powder itself or by adding a metal binder, another magnetic material, a resin, or the like and molding. When the magnetic material powder is in the state after step (2), or further after step (3), the first phase and the second phase may have already been continuously bonded directly or via a metal phase or an inorganic phase. In this case, the magnetic material powder in that state functions as a solid magnetic material even without subjected to the proper molding step.

As a method of solidifying only the magnetic material of the present invention, it is possible to use a method in which the magnetic material powder is placed in a mold, compacted in a cold state, and then used as it is, or the magnetic material powder may also be subjected to further cold rolling, forging, shock wave compression molding and the like, and then molded. In many cases, the method is carried out by sintering the magnetic material powder while heat treating it at a temperature of 50° C. or more. A method in which sintering is carried out without pressurization and just by heat treating is called pressureless sintering method. The heat treatment atmosphere is preferably a non-oxidizing atmosphere, and it is desirable to perform the heat treatment in an inert gas, such as a rare gas like argon or helium or nitrogen gas, or in a reducing gas including hydrogen gas. The heat treatment can be carried out even in air if the temperature is 500° C. or less. Further, like pressureless sintering, the sintering may be carried out in a heat treatment atmosphere that is at ordinary pressure, or in a pressurized heat treatment atmosphere of 200 MPa or less, or even in a vacuum.

Regarding the heat treatment temperature, in addition to ordinary temperature molding carried out at less than 50° C. the heat treatment temperature is preferably 50° C. to 1425° C. for pressure molding and 400° C. or more and 1425° C. or less for pressureless sintering. At temperatures above 1300° C., the material may melt, and hence it is necessary to carefully select the composition range. Therefore, a particularly preferable temperature range for molding is 50° C. or more and 1300° C. or less.

This heat treatment can also be carried out simultaneously with the powder compacting. Further, the magnetic material of the present invention can be molded even by a pressure sintering method, such as hot pressing, HIP (hot isostatic pressing), electric current sintering, and SPS (spark plasma sintering). To make the pressurizing effect remarkable in the present invention, it is preferable that the pressurizing force in the heating and sintering step is within the range of 0.0001 GPa or more and 10 GPa or less. If the pressurizing force is less than 0.0001 GPa, the effect of pressurization is poor and there is no change in the electromagnetic properties from pressureless sintering. In such a case, pressure sintering is disadvantageous due to the resultant drop in productivity. If the pressurizing force exceeds 10 GPa, the beneficial limits of pressurizing are reached, and hence unnecessary pressurizing only results in a drop in productivity.

In addition, strong pressurization imparts induced magnetic anisotropy to the magnetic material, and there is a possibility that the permeability and coercive force deviate from the ranges in which they are to be controlled. Therefore, the preferable range of the pressurizing force is 0.001 GPa or more and 2 GPa or less, and more preferably 001 GPa or more and 1 GPa or less.

Among hot pressing methods, an ultra-high-pressure HP method, in which a powder compacted molded body is prepared in a capsule that plastically deforms, and then hot pressed by heat treating while applying a strong pressure in one to three axis directions, is capable of inhibiting the entry of unwanted excess oxygen. This is because in such a method, unlike a hot pressing method in which the pressurized heat treatment is performed in a die made of cemented carbide or carbon using a uniaxial compressor, a pressure of 2 GPa or more, which is difficult even when using a tungsten carbide cemented carbide die, can be applied on the material without problems such as breaking the die, and the molding can be carried out without contact with the air because the interior of the capsule is hermetically sealed as a result of the plastic deformation by the pressure.

Prior to molding, to adjust the powder particle diameter, coarse pulverization, fine pulverization, or classification can be carried out by using a known method.

Coarse pulverization is a step carried out before molding when the reduced powder is a massive object of several mm or more, or is a step carried out when again pulverizing after molding. The coarse pulverization is carried out using a jaw crusher, a hammer, a stamp mill, a rotor mill, a pin mill, a coffee mill, and the like.

Further, after coarse pulverization, in order to further adjust the density and molding properties at the time of molding, it is also effective to adjust the particle diameter by using a sieve, a vibration classifier or sound classifier, a cyclone, and the like. Coarse pulverization and classification followed by annealing in an inert gas or hydrogen can eliminate structural defects and distortion, and in some cases may have an effect.

Fine pulverization is carried out when it is necessary to pulverize the reduced magnetic material powder or the molded magnetic material from a submicron size to a size of several tens of μm.

Examples of the fine pulverization method include, in addition to the methods described above for coarse pulverization, using a dry or a wet fine pulverizing apparatus such as a rotary ball mill, a vibration ball mill, a planetary ball mill, a wet mill, a jet mill, a cutter mill, a pin mill, and an automatic mortar.

A typical example of the method for producing the solid magnetic material of the present invention is to produce a nickel ferrite nanopowder by step (1), reduce the nickel ferrite nanopowder by step (2), and then carry out step (3) followed by step (4), or perform molding only by step (4). A particularly preferable example of the production method is to prepare the nickel ferrite nanopowder by the wet method exemplified in step (1), then reduce the nickel ferrite nanopowder by a method including hydrogen gas described in step (2), gradually oxidize the reduced nickel ferrite nanopowder to expose to a low oxygen partial pressure described in step (3) at ordinary temperature, mold by the sintering method at ordinary pressure or under pressure described in step (4), in particular remove the oxygen on the powder surface of the material in step (3), and then, as step (4), carry out molding in hydrogen to prevent any further oxygen from entering the material. The present solid magnetic material can be molded to a thickness of 0.5 mm or more, and can be worked into an arbitrary shape by cutting and/or plastic working.

When the magnetic material powder obtained by step (1)→step (2), or by step (1)→step (2)→step (3), or by step (1)→step (2)→step (5) (described later), or by step (1)→step (2)→step (3)→step (5) (described later), or the magnetic material powder obtained by re-pulverizing a magnetic material obtained by molding a magnetic material powder obtained by the above steps by step (4), or the magnetic material powder obtained by annealing a magnetic material powder obtained by the above steps in step (5) (described later), is applied in a composite material with a resin, such as a high frequency magnetic sheet, the magnetic material powder is molded by mixing with a thermosetting resin or a thermoplastic resin and then compression molded, or is kneaded together with a thermoplastic resin and then injection molded, or is extrusion molded, roll molded, calendar molded or the like.

In the case of applying in an electromagnetic noise absorbing sheet, for example, examples of the type of sheet shape include a batch type sheet obtained by compression molding, various rolled sheets obtained by roll molding, calendar molding, and the like, and cut or molded sheets of various sizes, such as A4 plate, having a thickness of 5 μm or more and 10 mm or less, a width of 5 mm or more and 5 m or less, and a length of 0.005 mm or more and 1 m or less.

(5) Annealing Step

The magnetic material of the present invention has a first phase and a second phase, and typically one or both of those phases have a crystal grain size in the nano region.

As long as the object of the present invention is not hindered, it may be preferable to carry out annealing for various purposes, such as for crystal distortions and defects that are produced in the various steps, stabilization of non-oxidized active phases, and the like. The expression "as long as the object of the present invention is not hindered" refers to the avoidance of situations in which the nanocrystals become more coarse due to, for example, improper grain growth as a result of the annealing, or situations in which the magnetic anisotropy near the crystal boundaries, which was required in order to adjust the permeability appropriately, is lost, thereby conversely causing an increase in the coercive force and inhibiting realization of the low permeability of the present invention.

For example, after the nickel ferrite nanopowder production step (1), to carry out stable reduction simultaneously with drying for the purpose of removing volatile components such as moisture content, a so-called preliminary heat treatment (annealing) in which fine particle components of about several nm are heat treated may be carried out for the purposes of inhibiting improper grain growth and removing lattice defects in subsequent steps. In this case, it is preferable to perform the annealing in air, in an inert gas, or in a vacuum at about 50° C. to 500° C.

Further, the coercive force of the soft magnetic material of the present invention can be decreased by, after the reduction step (2), removing distortions and defects in the crystal lattice and microcrystais caused by the decrease in the volume due to grain growth and reduction. After this step, in applications in which the soft magnetic material of the present invention is used in powder form, for example, in applications such as powder magnetic cores used by hardening a powder with a resin, ceramic, or the like, electromagnetic properties may be improved by carrying out annealing under appropriate conditions after that step or after a pulverization step or the like that is carried out after this step.

In addition, in the gradual oxidation step (3), annealing may be useful for removing distortions and defects caused by surface oxidation that are present near the surface, interfaces, and boundaries.

Annealing after the molding step (4) is most effective. The annealing step may be proactively carried out after preliminary molding, compression molding, hot pressing, and the like, or the subsequent cutting and/or plastic working to remove the distortions and defects in the crystal lattices and microstructure caused by those steps. In the annealing step, there is expected to be a dramatic decrease in the distortions, defects, and the like that have accumulated in the steps prior to that. Furthermore, after the above-mentioned cutting and/or plastic working steps, the distortions in steps (1) to (4), steps (2) to (4), steps (3) and (4), or step (4) may be annealed, or the distortions that have accumulated in those steps may be annealed collectively.

The annealing atmosphere may be any one of a vacuum, a reduced pressure, an ordinary pressure, or a pressurized atmosphere of 200 MPa or less. The gas species to be used may be an inert gas, typified by a rare gas such as argon, nitrogen gas, a reducing gas such as hydrogen gas, or an atmosphere containing an oxygen source such as air. The annealing temperature may be from ordinary temperature or more to 1350° C. or less, and in some cases the treatment may be carried out at a low temperature from a liquid nitrogen temperature to ordinary temperature. The apparatus used in the annealing step may be the same as the apparatus used in the reduction step and the molding step, or it may be constructed by combining known apparatuses.

EXAMPLES

The present invention will now be described in more detail by way of examples, but the present invention is in no way limited to these examples.

The methods for evaluating the present invention are as follows.

(I) Saturation Magnetization and Coercive Force

In the case of a magnetic powder, the powder was prepared in a cylindrical case made of polypropylene (inner diameter: 2.4 mm, powder layer thickness approximately 1.5 mm). In the case of a disk-shaped molded body, the molded body was molded on a disk having a diameter of 3 mm and a thickness of approximately 1 mm. Then, using a vibrating sample type magnetometer (VSM), a full loop of the magnetic curve in the region where the external magnetic field is −7.2 MA/in to 7.2 MA/in was drawn, and the values of the saturation magnetization (emu/g) and coercive force (A/m) at room temperature were obtained. The saturation magnetization was corrected with a 5N Ni standard sample, and calculated based on the law of approach to saturation. The coercive three was corrected using a paramagnetic Pd standard sample and/or $Gd_2O_3$ standard sample to correct the magnetic field shift in the low magnetic field region. The coercive force was also measured by a VSM method using a Helmholtz type coil to confirm the validity of the measured value. In this measurement, if a smooth step or inflection point is not seen on the magnetic curve up to the zero magnetic field after magnetization up to 7.2 MA/m, it is determined that there is no (i.e. "absent") "inflection point on the ¼ major loop".

In all of the examples shown below it was confirmed that an "inflection point on the ¼ major loop" was "absent", and ferromagnetic coupling was recognized.

The direction of the measurement magnetic field is the axial direction in the case of the magnetic powder and the radial direction in the case of the disk-shaped molded body.

The magnetic properties of a cuboid molded body were measured for a solid magnetic material with a sample size of 15 mm×5 mm×1 mm using a direct-current magnetization measuring machine (direct-current BH loop tracer) equipped with a small single-plate measurement jig. For the magnetization measurement of the cuboid molded body, its magnetization in an external magnetic field of 150 Oe was regarded as the saturation magnetization, with a value expressed in T (Tesla) units.

(II) Oxidation Resistance

The saturation magnetization $\sigma_{st}$ (emu/g) of a magnetic powder that had been left in air at an ordinary temperature for a certain period t (days) was measured by the above method, compared with an initial saturation magnetization $\sigma_{s0}$ (emu/g), and the rate of decrease in the saturation magnetization was evaluated based on the following expression.

$$\Delta\sigma_s(\%) = 100 \times (\sigma_{s0} - \sigma_{st})/\sigma_{s0}$$

The oxidation resistance performance can be determined as being higher as the absolute value of $\Delta\sigma_s$ approaches zero. In the present invention, a magnetic powder having an absolute value of $\Delta\sigma_s$ of 1% or less was evaluated as having good oxidation resistance for a period of t days. In the present invention, t (days) is.

(III) Electric Resistivity

In the case of a disk-shaped molded body having a sample size of 3 mmφ×1 mm, the electric resistivity was measured by the van der Pauw method.

In the case of a cuboid molded body having a sample size of 15 mm×15 mm×1 mm, the electric resistivity was measured by the four-terminal method. Further, the electric resistivity was also measured by the van der Pauw method to confirm the validity of the measured value.

(IV) Fe Content, Ni Content, Oxygen Content, and α-(Fe, Ni) Phase Volume Fraction The Fe content and the Ni content in the powder and the bulk magnetic material were quantified by X-ray fluorescence elemental analysis. The Fe content and the Ni content in the first phase and the second phase of the magnetic material were quantified by EDX included in an FE-SEM based on an image observed by the FE-SEM. Further, the volume fraction of the α-(Fe, Ni) phases was quantified by image analysis by combining a method using the above-mentioned FE-SEM together with the results of the XRD method. Mainly to distinguish whether the observed phase is an α-(Fe,Ni) phase or an oxide phase, an oxygen characteristic X-ray surface distribution map using SEM-EDX was used. In addition, the validity of the value of the volume fraction of the α-(Fe,Ni) phases was also confirmed from the value of the saturation magnetization measured in (I).

The oxygen content of the magnetic material after the reduction step was also confirmed based on the decrease in weight after reduction. In addition, image analysis by SEM-EDX was used for identification of each phase.

The K content was quantified by X-ray fluorescence elemental analysis.

(V) Average Powder Particle Diameter

The powder particle diameter was determined by observing the magnetic powder with a scanning electron microscope (SEM) or a transmission electron microscope (TEM). The powder particle diameter was determined to one significant digit by selecting portions representing the whole material, and setting n to be a number of 100 or more.

When using together with a laser diffraction type particle size distribution analyzer, the volume-equivalent diameter distribution was measured and evaluated in terms of a median diameter (μm) obtained from the distribution curve thereof. However, the value is employed only when the obtained median diameter is 500 nm or more and less than 1 mm. It was confirmed that such a value agrees to one significant digit with the powder particle diameter roughly estimated by a method using a microscope.

(VI) Average Crystal Grain Size

The magnetic material was observed the with a scanning electron microscope (SEM) or a transmission electron microscope (TEM), and the size of a portion surrounded by a crystal boundary was obtained to one significant digit. The measurement area was determined by selecting portions sufficiently representative of the whole, and setting the number n to 100 or more. The crystal grain size was determined by separately measuring the average value of the whole, and the average value of only the first phase and the second phase, respectively.

(VII) Crystallite Size

The crystallite size was determined by applying the Scherrer equation to the line width of the (200) diffraction line of the bcc phases measured by X-ray diffraction, and taking the dimensionless form factor to be 0.9.

Example 1 and Comparative Example 1

An aqueous solution of $NiCl_2 \cdot 6H_2O$ (aqueous solution of nickel (II) chloride hexahydrate) and an aqueous solution of $FeCl_2 \cdot 4H_2O$ (ferric chloride(II) tetrahydrate) were separately prepared, and then mixed to form a mixed aqueous solution of $NiCl_2$ and $FeCl_2$ adjusted to 50.3 mM, which was prepared in a reactor as a reaction field solution (composition of nickel and element M contained in the mixed aqueous solution is referred to as the "composition in preparation" of 4 atom %). Next, a 660 mM aqueous potassium hydroxide solution (pH adjusting solution) was added dropwise while vigorously stirring in air, and the pH of the system gradually shifted from the acidic side to the alkaline side within a range of 4.64 to 12.97. At the same time, a mixed aqueous solution of $FeCl_2$ and $NiCl_2$ of 168 mM (reaction liquid, nickel composition in preparation: 4 atom % was added dropwise and reacted for 15 minutes, then the addition of the pH adjusting solution and the reaction solution was stopped, and the stirring operation was further continued for 15 minutes. Next, the solid component was precipitated by centrifugation, redispersed in purified water and repeatedly subjected to centrifugation to adjust the pH of the supernatant solution to 8.34. Finally, the precipitate was dispersed in ethanol, and then subjected to centrifugation.

Figure 4:
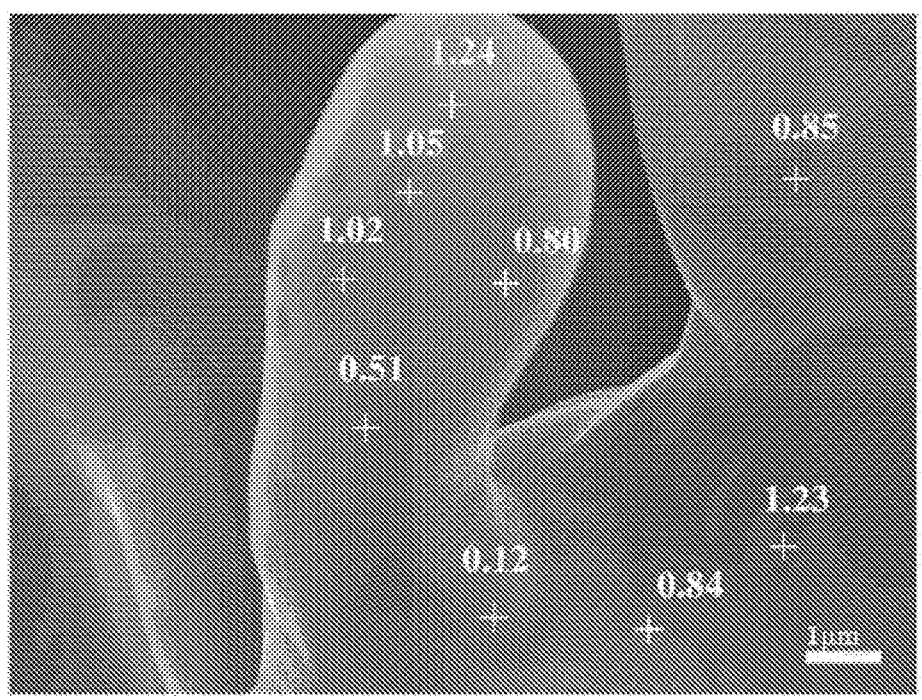
FIG. 4 is an SEM image of a magnetic material powder (Example 2) obtained by reducing a $(Fe_{0.99}Ni_{0.01})_3O_4$ ferrite nanopowder in hydrogen at 1100° C. (the numerical values in the diagrams are the Ni content at the "+" position).

After that, vacuum drying was carried out at ordinary temperature overnight to obtain a Ni-ferrite nanopowder having a $(Fe_{0.96}Ni_{0.04})_3O_4$ composition having an average powder particle diameter of 20 nm. As a result of analyzing the nanopowder by X-ray diffraction, it was found that the cubic Ni-ferrite phase was the main phase and a slight amount of a rhombohedral Ni-hematite phase was contained as an impurity phase. Further, an SEM image of this nanopowder is shown in FIG. 4. In the photograph, the spherical powder is a Ni-ferrite nanopowder and the plate-like powder with a thickness of several nm is the impurity phase. Therefore, this powder did not contain an α-(Fe,Ni) phase, and was hence used as the powder of Comparative Example 1. The magnetic properties, and the like of this powder are shown in Table 1.

The Ni-ferrite nanopowder was prepared in a crucible made of alumina, the temperature was increased at 10° C./min up to 300° C. in a hydrogen flow, the temperature was increased at 12° C./min from 300° C. to 1100° C., and then a reduction treatment was carried out at 1100° C. for 1 hour. After that, the temperature was lowered at a rate of 1.10"C/min to 400° C., and then cooled from 400° C. to room temperature over 40 minutes. Next, a gradual oxidation treatment was carried out at 20° C. in an argon atmosphere having an oxygen partial pressure of 1% by volume for 1 hour to obtain a magnetic material having a composition ratio of nickel to iron of $Fe_{96.2}Ni_{3.8}$ The O content relative to the whole magnetic material was 0.1 atom % or less, and the K content was also 0 atom %. Further, the average powder particle diameter of the Fe—Ni magnetic material was 30 μm. Analysis on this magnetic material was carried out by the following method, and this magnetic material was used as Example 1.

As a result of evaluating the obtained magnetic material by X-ray diffraction, it was confirmed that an α-(Fe,Ni) phase, which is a bcc phase, is the main component. In addition, an α-(Fe,Ni) phase having a higher Ni content than this phase was also confirmed to be present. As a result, it was confirmed that the α-(Fe,Ni) phase which is a bcc phase and has a higher Ni content corresponds to the first phase and corresponds to the α-(Fe,Ni) phase which is a bcc phase and has a higher Ni content.

The volume fraction of the all the bcc phases, including these second phases, was estimated to be 99% by volume or more.

Figure 3:
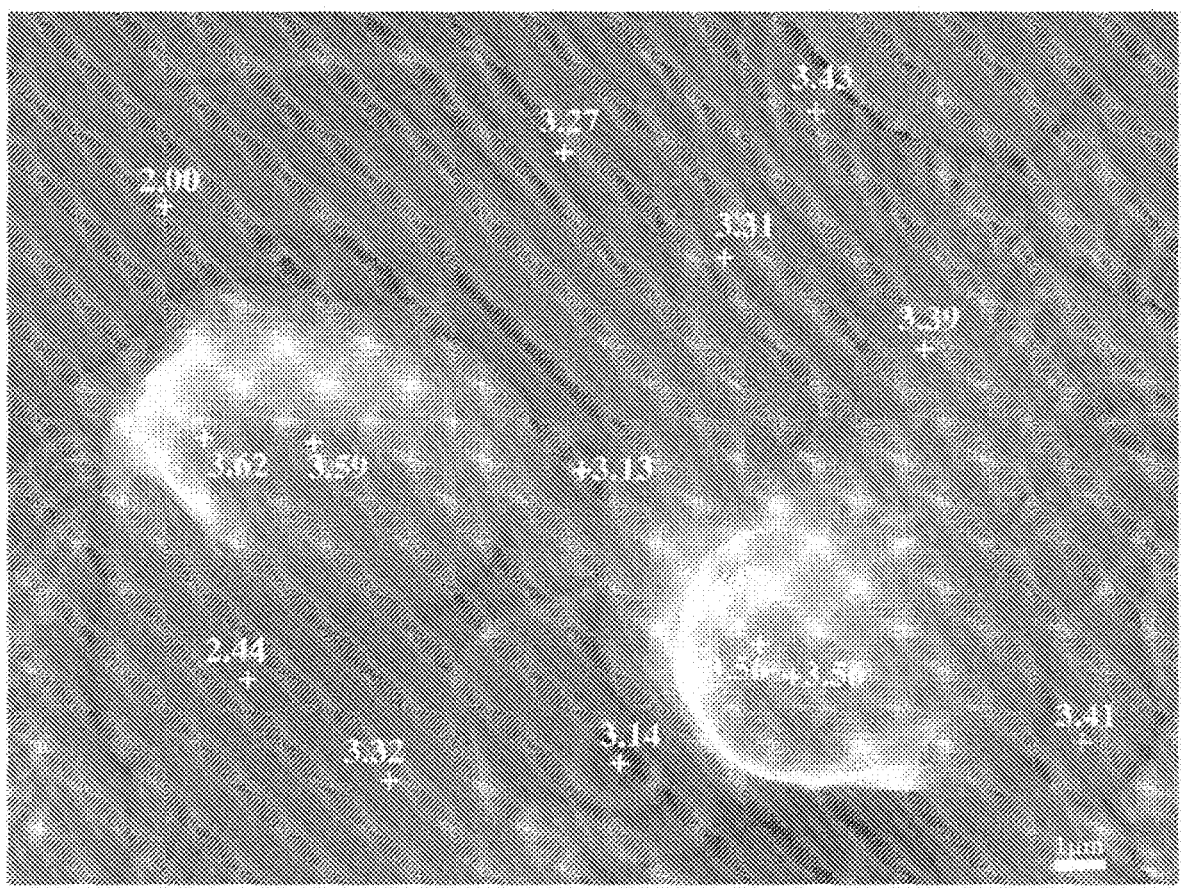
FIG. 3 is an SEM image of a magnetic material powder (Example 1) obtained by reducing a $(Fe_{0.96}Ni_{0.04})_3O_4$ ferrite nanopowder in hydrogen at 1100° C. (the numerical values in the diagrams are the Ni content at the "+" position).

The magnetic material powder was also observed by FE-SEM/EDX, which is suitable for finding the local Ni content of the magnetic material and the presence and extent of disproportionation. As a result, as shown in FIG. 3, the content of Ni in each phase of the magnetic material (the numerical values in the diagram are the Ni content in each phase, represented as the percentage value of the atomic ratio of Ni to the total of Ni and Fe in each phase) was found to be distributed in a very disproportionate manner from 2.0 to 3.6 atom %. In addition, in FIG. 3, innumerable curved crystal boundaries curved at an interval in the order of tens of nanometers were also observed in a region thought to be one α-(Fe,Ni) phase. Therefore, it is clear from these results that even in the α-(Fe,Ni) phase region, there are phases that can be distinguished based on Ni content, for example, an α-(Fe,Ni) phase having a Ni content of 3.1 atom %, which is 1.1 times or more and $10^5$ times or less and which is 2 atom % or more and 100 atom %) or less, for an α-(Fe,Ni) phase having a Ni content of 2.0 atom %), namely, that regarding the α-(Fe,Ni) phases, a phase other than the first phase and that corresponds to the second phase is also present.

The content of each of the Ni, Fe, O, and K components in the powder (magnetic material) was about 3.8 atom % (3.7 atom % or more and 3.8 atom % or less) for Ni, 96.2 atom % for Fe, 0 atom % or more and 0.1 atom % or less for O, and 0 Atom % for K relative to the whole magnetic material. Further, the average powder grain size of this magnetic material powder was 50 μm.

The average crystal grain size of the whole magnetic material was 90 nm. The crystal grain sizes of the first phase and the second phase were 100 nm and 70 nm, respectively. In addition, observation of the crystal boundary vicinity at a magnification of 750,000 times confirmed that no heterogenous phases existed near these crystal boundaries.

The saturation magnetization of this magnetic material was 212.2 emu/g, the coercive force was 227.3 A/m, and there was no inflection point on the ¼ major loop.

Therefore, since the magnetic material of Example 1 has a coercive force of 800 A/m or less, it was confirmed to be a soft magnetic material. The measurement results of the phases, crystallite sizes, and magnetic properties of this example are shown in Table 1.

Comparative Examples 2 to 4

Ferrite nanopowders were prepared in the same manner as in Example 1, except that the Ni component (aqueous solution of nickel chloride) was not added.

Fe metal powders were prepared in the same manner as in Example 1, except that the above ferrite nanopowders were used and the reducing conditions were 425° C. for 1 hour (Comparative Example 2), the same temperature for 4 hours (Comparative Example 3), and 450° C. for 1 hour (Comparative Example 4).

The average powder grain sizes were 100 nm (Comparative Example 2), 2 μm (Comparative Example 3), and 2 μm (Comparative Example 4). Further, the measurement results of the magnetic properties are shown in Table 1.

Examples 2 to 6

Ferrite nanopowders were prepared in the same manner as in Example 1, except that the Ni composition in preparation was changed to 1 atom % (Example 2), 3 atom % (Example 3), 6 atom % (Example 4), 8 atom % (Example 5), and 12 atom % (Example 6).

These ferrite nanopowders were treated in the same manner as in Example 1 to prepare magnetic material powders.

The measurement results of the grain size and the magnetic properties of these magnetic material powders are shown in Table 1.

The content of each of the Ni, Fe, O, and K components in the powder of Example 2 was 0.8 atom % or more and 0.9 atom % or less for Ni, 99.1 atom % for Fe, 0 atom % or more and 0.1 atom % or less for O, and 0 atom % for K relative to the whole magnetic material. Further, the average powder grain size of this magnetic material powder was 30 μm.

The material of Example 2 was also observed by FE-SEM/EDX, which is suitable for finding the local Ni content of the magnetic material and the presence and extent of disproportionation. As a result, as shown in FIG. 4, the content of Ni in each phase of the magnetic material (the numerical values in the diagram are the Ni content in each phase, represented as the percentage value of the atomic ratio of Ni to the total of Ni and Fe in each phase) was found to be distributed in a very disproportionate manner of 0.12 atom % or more and 1.24 atom % or less. In addition, in FIG. 4, innumerable curved crystal boundaries curved at an interval in the order of tens of nanometers were also observed in a region thought to be one α-(Fe,Ni) phase. Therefore, it is clear from these results that even in the α-(Fe,Ni) phase region, there is a phase that can be distinguished based on Ni content, for example, an α-(Fe,Ni) phase having a Ni content of 1.24 atom %, which is 1.1 times or more and $10^5$ times or less the content of an α-(Fe,Ni) phase having a Ni content of 0.12 atom %, namely, that regarding the α-(Fe,Ni) phases, a phase other than the first phase and that corresponds to the second phase is also present.

The average crystal grain size of the whole magnetic material was about 90 nm. The crystal grain size of the first phase and the second phase was 100 nm and 70 nm, respectively. In addition, observation of the crystal boundary vicinity at a magnification of 750,000 times confirmed that no heterogenous phases existed near these crystal boundaries.

Example 7

An aqueous solution of $MnCl_2 \cdot 4H_2O$ (manganese(II) chloride tetrahydrate), an aqueous solution of $NiCl_2 \cdot 6H_2O$ (nickel(II) chloride hexahydrate), and an aqueous solution of $FeCl_2 \cdot 4H_2O$ (iron (II) chloride tetrahydrate) were separately prepared, and then mixed to form a mixed aqueous solution of $MnCl_2$, $NiCl_2$, and $FeCl_2$ adjusted to 50.3 mM, which was placed in a reactor as a reaction field solution (nickel composition in preparation of 4 atom % and manganese composition in preparation of 0.1 atom %). Next, a 660 mM aqueous potassium hydroxide solution (pH adjusting solution) was added dropwise while vigorously stirring in air, and the pH of the system gradually shifted from the acidic side to the alkaline side within a range of 4.54 to 12.87. At the same time, a mixed aqueous solution (reaction solution: nickel composition in preparation of 4 atom % and manganese composition in preparation of 0.1 atom %) of $FeCl_2$ and $NiCl_2$ of 168 mM was added dropwise and reacted for 15 minutes, then the addition of the pH adjusting solution and the reaction solution was stopped, and the stirring operation was further continued for 15 minutes. Next, the solid component was precipitated by centrifugation, redispersed in purified water and repeatedly subjected to centrifugation to adjust the pH of the supernatant solution to 8.32. Finally, the precipitate was dispersed in ethanol, and then subjected to centrifugation.

The magnetic material powder was produced by treating this ferrite nanopowders in the same manner as in Example 1.

The saturation magnetization of this magnetic material was 220.9 emu/g, the coercive force was 20.1 A/m, and there was no inflection point on the ¼ major loop. The saturation magnetization of this magnetic material exhibited a value that exceeded the mass magnetization (218 emu/g) of α-Fe.

The measurement results of the phases, crystallite sizes, and magnetic properties of these examples are shown in Table 2.

Examples 8 and 9

Ferrite nanopowders were prepared in the same manner as in Example 7, except that the manganese composition in preparation was changed to 0.2 atom % (Example 8) and 0.3 atom % (Example 9).

The ferrite nanopowders were treated in the same manner as in Example 1 to prepare magnetic material powders.

The measurement results of the phases, the crystallite size, and the magnetic properties of these magnetic material powders are shown in Table 2.

Examples 10 to 24

Ferrite nanopowders were prepared in the same manner as in Example 7, except that the nickel composition in preparation and the manganese composition in preparation were changed the values shown in Table 1.

These ferrite nanopowders were treated in the same manner as in Example 1 to prepare magnetic material powders.

The measurement results of the phases, crystallite size, and the magnetic properties of these magnetic material powders are shown, along with the measurement results of Examples 7 to 9, in Table 2 (Examples 7 to 15) and Table 3 (Examples 16 to 24).

Figure 5:
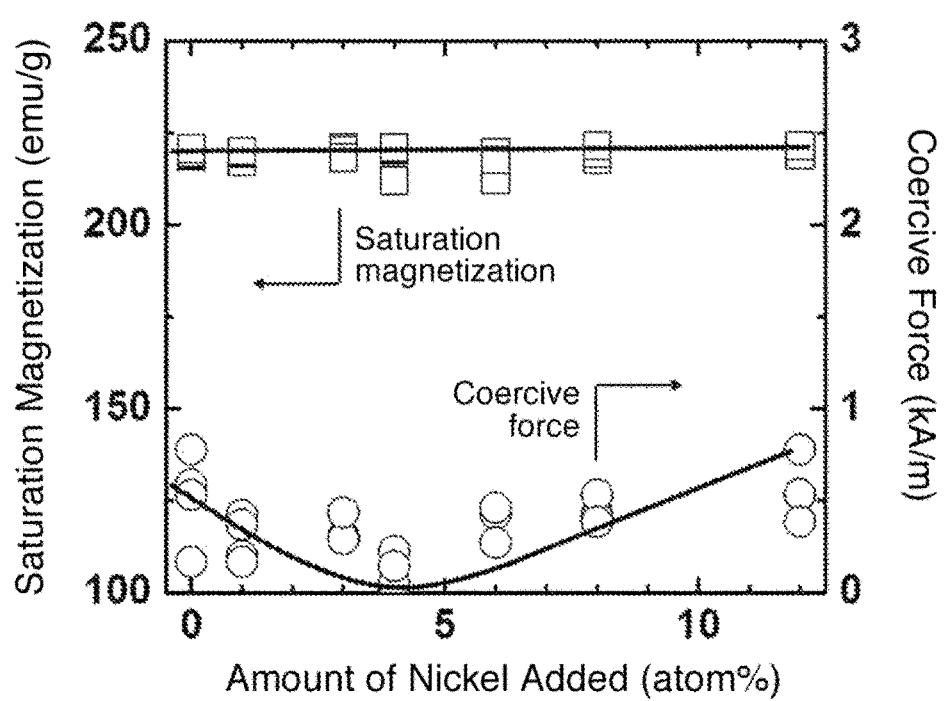
FIG. 5 shows the dependence of saturation magnetization (emu/g) and coercive force (kA/m) on the nickel amount in preparation (atom %) in Fe—Ni magnetic material powders (Examples 1 to 24).

In FIG. 5, the measurement results of the saturation magnetization and the coercive force of Examples 1 to 24 are summarized with respect to the nickel composition in preparation.

As shown in Tables 1 to 3, the magnetic materials of Examples 1 to 24 had a coercive force of 800 A/m or less, and were thus confirmed to be soft magnetic materials.

The material of Example 7 was also observed by the FE-SEM/EDX, which is suitable for finding the local Ni content of the magnetic material and the presence and extent of disproportionation. The average crystal grain size of the whole magnetic material was 80 nm. The crystal grain size of the first phase and the second phase was 50 nm and 60 nm, respectively. Further, as a result of observation of the crystal boundary vicinity at a magnification of 750,000 times, it was confirmed that no heterogeneous phases existed near these crystal boundaries.

Further, the rate of change $\Delta \sigma_s$ (%) of the saturation magnetization of the obtained magnetic powders was found to be 4.3 (Example 6), −1.0 (Example 8), 0.4 (Example 16), and −0.3 (Example 24). The fact that $\Delta \sigma_s$ is a negative value indicates that saturation magnetization is improved after leaving at an ordinary temperature as compared with immediately after preparation of each magnetic powder. From these results, it was found that the oxidation resistance of the metal powders of these examples is good at t=60.

Compared with this, in Comparative Examples 2 to 4, the rate of change $\Delta \sigma_s$ (%) was 5.4 (Comparative Example 2), 19.0 (Comparative Example 3), and 21.3 (Comparative Example 4), respectively. Oxidation resistance was poor at t=60, and the magnetic powder of the present invention is far superior.

The content of each of the Ni, Mn, Fe, O, and K components in the powder (magnetic material) of Example 24 was about 12 atom % (12.2 atom % or more and 12.3 atom % or less) for Ni, 0.3 atom % for Mn, 87.4 atom % for Fe, 0 atom % or more and 0.1 atom % or less for O, and 0 atom % for K relative to the whole magnetic material. Further, the average powder grain size of this magnetic material powder was 50 μm.

Examples 25 to 30

Magnetic material powders were prepared by treating the ferrite powders of Examples 7 to 12 in the same in the same manner as in Example 1, except that the heat treatment conditions were changed to 900° C. for one hour.

The phases, magnetic properties, and the like of these samples are shown in Table 4.

As shown in Table 4, the magnetic materials of Examples 25 to 30 had a coercive force of 800 A/m or less, and were thus confirmed to be soft magnetic materials.

TABLE 1

| Example | Ni Composition in Preparation (atom %) | Reduction Temperature (° C.) | Reduction Time (hours) | First Phase | Second Phase | bcc Phase Volume Fraction (volume %) | Crystallite Size (nm) | Saturation Magnetization (cmu/g) | Coercive Force (A/m) |
|---|---|---|---|---|---|---|---|---|---|
| Example 1 | 4 | 1100 | 1 | α-(Fe,Ni) phase | α-(Fe,Ni) phase | >99 | 40 | 212.1 | 227.3 |
| Comparative Example 1 | 4 | — | — | — | — | — | 30 | 78.1 | 4800 |
| Example 2 | 1 | 1100 | 1 | α-(Fe,Ni) phase | α-(Fe,Ni) phase | >99 | 50 | 217.2 | 424.3 |
| Example 3 | 3 | 1100 | 1 | α-(Fe,Ni) phase | α-(Fe,Ni) phase | >99 | 50 | 218.2 | 304.8 |
| Example 4 | 6 | 1100 | 1 | α-(Fe,Ni) phase | α-(Fe,Ni) phase | >99 | 30 | 217.7 | 429.3 |
| Example 5 | 8 | 1100 | 1 | α-(Fe,Ni) phase | α-(Fe,Ni) phase | >99 | 30 | 219.2 | 428.4 |
| Example 6 | 12 | 1100 | 1 | α-(Fe,Ni) phase | α-(Fe,Ni) phase | >99 | 30 | 219.4 | 781.5 |
| Comparative Example 2 | 0 | 425 | 1 | — | — | — | — | 85.9 | 3700 |
| Comparative Example 3 | 0 | 425 | 4 | — | — | — | — | 214.6 | 3200 |
| Comparative Example 4 | 0 | 450 | 1 | — | — | — | — | 216.6 | 14200 |

TABLE 2

| Example | Ni Composition in Preparation (atom %) | Mn Composition in Preparation (atom %) | Reduction Temperature (° C.) | Reduction Time (hours) | First Phase |
|---|---|---|---|---|---|
| Example 7 | 4 | 0.1 | 1100 | 1 | α-(Fe,Ni) phase |
| Example 8 | 4 | 0.2 | 1100 | 1 | α-(Fe,Ni) phase |
| Example 9 | 4 | 0.3 | 1100 | 1 | α-(Fe,Ni) phase |
| Example 10 | 1 | 0.1 | 1100 | 1 | α-(Fe,Ni) phase |
| Example 11 | 1 | 0.2 | 1100 | 1 | α-(Fe,Ni) phase |
| Example 12 | 1 | 0.3 | 1100 | 1 | α-(Fe,Ni) phase |
| Example 13 | 3 | 0.1 | 1100 | 1 | α-(Fe,Ni) phase |
| Example 14 | 3 | 0.2 | 1100 | 1 | α-(Fe,Ni) phase |
| Example 15 | 3 | 0.3 | 1100 | 1 | α-(Fe,Ni) phase |

| Example | Second Phase | bcc Phase Volume Fraction (volume %) | Crystallite Size (nm) | Saturation Magnetization (cmu/g) | Coercive Force (A/m) |
|---|---|---|---|---|---|
| Example 7 | α-(Fe,Ni) phase wustite phase | >99 | 50 | 220.9 | 20.1 |
| Example 8 | α-(Fe,Ni) phase wustite phase | >99 | 40 | 220.3 | 53.3 |
| Example 9 | α-(Fe,Ni) phase wustite phase | >99 | 50 | 221.0 | 143.9 |
| Example 10 | α-(Fe,Ni) phase wustite phase | >99 | 60 | 219.8 | 202.1 |
| Example 11 | α-(Fe,Ni) phase wustite phase | >99 | 50 | 219.4 | 168.4 |
| Example 12 | α-(Fe,Ni) phase wustite phase | >99 | 50 | 220.0 | 372.6 |
| Example 13 | α-(Fe,Ni) phase wustite phase | >99 | 50 | 221.1 | 299.3 |
| Example 14 | α-(Fe,Ni) phase wustite phase | >99 | 40 | 220.2 | 292.6 |
| Example 15 | α-(Fe,Ni) phase wustite phase | >99 | 50 | 218.3 | 437.0 |

TABLE 3

| Example | Ni Composition in Preparation (atom %) | Mn Composition in Preparation (atom %) | Reduction Temperature (° C.) | Reduction Time (hours) | First Phase |
|---|---|---|---|---|---|
| Example 16 | 6 | 0.1 | 1100 | 1 | α-(Fe,Ni) phase |
| Example 17 | 6 | 0.2 | 1100 | 1 | α-(Fe,Ni) phase |
| Example 18 | 6 | 0.3 | 1100 | 1 | α-(Fe,Ni) phase |
| Example 19 | 8 | 0.1 | 1100 | 1 | α-(Fe,Ni) phase |
| Example 20 | 8 | 0.2 | 1100 | 1 | α-(Fe,Ni) phase |

TABLE 3-continued

| Example 21 | 8 | 0.3 | 1100 | 1 | α-(Fe,Ni) phase |
| Example 22 | 12 | 0.1 | 1100 | 1 | α-(Fe,Ni) phase |
| Example 23 | 12 | 0.2 | 1100 | 1 | α-(Fe,Ni) phase |
| Example 24 | 12 | 0.3 | 1100 | 1 | α-(Fe,Ni) phase |

| Example | Second Phase | bcc Phase Volume Fraction (volume %) | Crystallite Size (nm) | Saturation Magnetization (cmu/g) | Coercive Force (A/m) |
|---|---|---|---|---|---|
| Example 16 | α-(Fe,Ni) phase wustite phase | >99 | 40 | 219.7 | 274.2 |
| Example 17 | α-(Fe,Ni) phase wustite phase | >99 | 40 | 212.2 | 273.0 |
| Example 18 | α-(Fe,Ni) phase wustite phase | >99 | 40 | 217.6 | 463.6 |
| Example 19 | α-(Fe,Ni) phase wustite phase | >99 | 40 | 217.7 | 416.7 |
| Example 20 | α-(Fe,Ni) phase wustite phase | >99 | 40 | 219.3 | 535.9 |
| Example 21 | α-(Fe,Ni) phase wustite phase | >99 | 40 | 221.5 | 386.5 |
| Example 22 | α-(Fe,Ni) phase wustite phase | >99 | 30 | 218.9 | 532.6 |
| Example 23 | α-(Fe,Ni) phase wustite phase | >99 | 30 | 218.9 | 538.5 |
| Example 24 | α-(Fe,Ni) phase wustite phase | >99 | 20 | 218.2 | 683.1 |

TABLE 4

| Example | Ni Composition in Preparation (atom %) | Mn Composition in Preparation (atom %) | Fe Composition During Ferrite Powder Synthesis (atom %) | Reduction Temperature (° C.) | Reduction Time (hours) |
|---|---|---|---|---|---|
| Example 25 | 4 | 0.1 | 95.9 | 900 | 1 |
| Example 26 | 4 | 0.2 | 95.8 | 900 | 1 |
| Example 27 | 4 | 0.3 | 95.7 | 900 | 1 |
| Example 28 | 1 | 0.1 | 98.9 | 900 | 1 |
| Example 29 | 1 | 0.2 | 98.8 | 900 | 1 |
| Example 30 | 1 | 0.3 | 98.7 | 900 | 1 |

| Example | First Phase | Second Phase | bcc Phase Volume Fraction (volume %) | Saturation Magnetization (cmu/g) | Coercive Force (A/m) |
|---|---|---|---|---|---|
| Example 25 | α-(Fe,Ni) phase | α-(Fe,Ni) phase wustite phase | >99 | 214.3 | 393.0 |
| Example 26 | α-(Fe,Ni) phase | α-(Fe,Ni) phase wustite phase | >99 | 200.5 | 383.5 |
| Example 27 | α-(Fe,Ni) phase | α-(Fe,Ni) phase wustite phase | >99 | 219.4 | 472.2 |
| Example 28 | α-(Fe,Ni) phase | α-(Fe,Ni) phase wustite phase | >99 | 189.1 | 276.8 |
| Example 29 | α-(Fe,Ni) phase | α-(Fe,Ni) phase wustite phase | >99 | 216.7 | 455.1 |
| Example 30 | α-(Fe,Ni) phase | α-(Fe,Ni) phase wustite phase | >99 | 214.8 | 470.2 |

Example 31

The magnetic material of the present invention was produced in the same manner as in Example 1, except that the reduction temperature was set to 450° C.

As a result of evaluating the obtained magnetic material by X-ray diffraction, an α-(Fe,Ni) phase, which is a bcc phase, was confirmed to be present. In addition, a (Fe,Ni)O wustite phase having a higher Ni content than this phase was observed, and a Ni-ferrite was also confirmed to be slightly present. As a result, it was confirmed that the α-(Fe,Ni) phase that is a bcc phase corresponds to the first phase and the wustite and Ni-ferrite phases correspond to the second phase.

The volume fraction of the all the bcc phases was estimated to be about 61% by volume.

The content of each of the Ni, Fe, O, and K components in the powder (magnetic material) was 3.6 atom % for Ni, 56.4 atom % for Fe, about 38.8 atom % for O, and 1.2 atom % for K relative to the whole magnetic material. Further, the average powder grain size of this magnetic material powder was 200 nm.

Example 32

The magnetic material of the present invention was produced in the same manner as in Example 1, except that the reduction temperature was set to 450° C. and the reduction time was 2 hours.

As a result of evaluating the obtained magnetic material by X-ray diffraction, an α-(Fe,Ni) phase, which is a bcc phase, was confirmed to be present. In addition, a (Fe,Ni)O wustite phase having a higher Ni content than this phase was also confirmed to be present. As a result, it was confirmed that the α-(Fe,Ni) phase that is a bcc phase corresponds to the first phase and the wustite phase corresponds to the second phase.

The volume fraction of the all the bcc phases was estimated to be 79% by volume.

Example 33

The magnetic material of the present invention was produced in the same manner as in Example 1, except that the reduction temperature was set to 450° C. and the reduction time was 0.5 hours.

As a result of evaluating the obtained magnetic material by X-ray diffraction, an α-(Fe,Ni) phase, which is a bcc phase, was confirmed to be present. In addition, a (Fe,Ni)O wustite phase having a higher Ni content than this phase and a Ni-ferrite phase were also confirmed to be present. As a result, it was confirmed that the α-(Fe,Ni) phase that is a bcc phase corresponds to the first phase and the wustite and Ni-ferrite phases correspond to the second phase.

The volume fraction of the all the bcc phases was estimated to be 9% by volume.

Example 34

The magnetic material of the present invention was produced in the same manner as in Example 1, except that the reduction temperature was set to 600° C.

As a result of evaluating the obtained magnetic material by X-ray diffraction, an α-(Fe,Ni) phase, which is a bcc phase, was confirmed to be present. In addition, an α-(Fe,Ni) phase having a higher Ni content than this phase was also observed. It was confirmed that the α-(Fe,Ni) phase that is a bcc phase and has a lower Ni content corresponds to the first phase and the α-(Fe,Ni) phase that is a bcc phase and has a higher Ni content corresponds to the second phase.

The volume fraction of the all the bcc phases was estimated to be about 90% by volume.

The average crystal grain size of the whole magnetic material was 200 nm. The crystal grain size of the first phase and the second phase was 200 nm and 200 nm, respectively. Further, as a result of observation of the crystal boundary vicinity at a magnification of 750,000 times, it was confirmed that no heterogeneous phases existed near these crystal boundaries.

Example 35

A 3 mm φ×1 mm disk-shaped molded body was obtained by preparing the magnetic material powder of Example 9 in a 3 mm φ cemented carbide die made of tungsten carbide, and then subjecting to electric current sintering in a vacuum at 150° C. under 1.4 GPa.

Next, the electrically sintered body was annealed in hydrogen at 1000° C., for 1 hour to prepare a disk-shaped solid magnetic material. The increasing temperature rate and the high temperature rate are the same as in Example 1.

Further, this solid magnetic material was a soft magnetic material of the present invention, with a coercive force of 116.7 A/m, and on the other hand, as described in the above Example 9, in a powder state, the solid magnetic material had a coercive force of 143.9 A/m. The coercive force decreased as a result of the solidification of the powder due to ferromagnetic coupling caused by the sintering.

In addition, the solid magnetic material had an electric conductivity of about 15 μΩm, which is an electric resistivity higher by two orders of magnitude compared with the 0.1 μΩm of pure iron and the 0.5 μΩm of an electromagnetic steel sheet.

Example 36

The magnetic material of the present invention was produced in the same manner as in Example 1, except that the Ni composition in preparation was changed to 16.7 atom % and the reduction temperature was set to 450° C.

As a result of evaluating the obtained magnetic material by X-ray diffraction, an α-(Fe,Ni) phase, which is a bcc phase, was confirmed to be present. In addition, a tetragonal FeNi phase having a Ni content of about 50 atom % was also observed as a minor phase. It was confirmed that the α-(Fe,Ni) phase that is a bcc phase and has a lower Ni content corresponds to the first phase and the α-(Fe,Ni) phase that has a higher Ni content corresponds to the second phase. As a result of SEM observation, the average crystal grain size of the first phase and the second phase was both 500 nm. Further, as a result of observation of the crystal boundary vicinity at a magnification of 750,000 times, it was confirmed that no heterogeneous phases existed near these crystal boundaries.

The volume fraction of the all the bcc phases was estimated to be about 50% by volume.

Relative to the whole magnetic material containing Ni, Fe, O, and K of the powder, the Ni content was 14.8 atom %, the Fe content was 84.3 atom %, the O content was 0.8 atom %, and the K content was 0.1 atom %. Further, the average powder grain size of this magnetic material powder was 750 nm.

The saturation magnetization of this magnetic material was 187.7 emu/g, the coercive force was 4786 A/m, and there was no inflection point on the ¼ major loop.

Therefore, since the magnetic material of Example 36 has a coercive force in the range of more than 800 A/m and 40 kA/m or less, it was confirmed to be a semi-hard magnetic material.

Example 37

A ferrite nanopowder $(Fe_{0.959}Ni_{0.040}Mn_{0.001})_3O_4$ was prepared in the same manner as Comparative Example 1. Then, a silica powder was added to this, and a reduction reaction was carried out in the same manner as in Example 1 to obtain a $Fe_{93.2}Ni_{3.9}Si_{2.8}Mn_{0.1}$ magnetic material powder having a powder grain size of 0.5 μm.

As a result of evaluating this magnetic material powder in the same manner as in Example 1 by FE-SEM/EDX, which is suitable for finding the local Ni content of the magnetic material and the presence and extent of disproportionation, it is clear that even in the α-(Fe,Ni) phase region, there is α-(Fe,Ni) phase that is a first phase and a phase that can be distinguished based on Ni content, that is, an α-(Fe,Ni) phase having a Ni content of 1.1 times or more and $10^5$ times or less the total of the Fe and Ni contained in the first phase, and a Ni content of 2 atom % or more and 100 atom %) or less (this "Ni content of 2 atom % or more and 100 atom % or less" is the content (atomic percentage) in the α-(Fe,Ni) phase that is distinguishable from the first to phase) is also present, namely, that regarding the α-(Fe,Ni) phases, a phase other than the first phase and that corresponds to the second phase is also present.

The crystal grain size of the first phase, the second phase, or the whole was 200 nm, and the crystallite size was 40 nm. Further, the bcc phase volume fraction was 98% or more, and the O content relative to the whole magnetic material was 1.4 atom %, and the K content was 0.

As a result of evaluating this magnetic material powder in the same manner as in Example 1 by FE-SEM/EDX, which is suitable for finding the local Ni content of the magnetic material and the presence and extent of disproportionation, it was found that fluctuations in the Ni composition were 1.1 times or more.

The saturation magnetization of this magnetic material was 229.9 emu/g, and the magnetic material was found to have a huge saturation magnetization exceeding the mass magnetization of bcc-Fe (218 emu/g), Further, the coercive force was 180.6 A/m, and there was no inflection point on the ¼ major loop.

Therefore, since the magnetic material of Example 37 has a coercive force of 800 A/m or less, it was confirmed to be the soft magnetic material of the present invention.

Example 38

A 15 mm×5 mm×1 mm rectangular molded body was obtained by preparing the magnetic material powder of Example 37 in a 15 mm×5 mm cemented carbide die made of tungsten carbide, and then subjected to cold compression molding in air at room temperature under 1 GPa.

Next, under an argon flow, the temperature was increased at 10° C./min to 300° C., held at 300° C. for 15 minutes, then increased from 300° C. to 900° C. at 10° C./min, after which the temperature was immediately lowered to 400° C. at 75° C./min, and the rectangular cold compression molded body was cooled from 400° C. to room temperature over 40 minutes. By applying this pressureless sintering, a rectangular solid magnetic material was obtained.

As a result of evaluating this solid magnetic material powder in the same manner as in Example 1 by FE-SEM/EDX, which is suitable for finding the local Ni content of the magnetic material and the presence and extent of disproportionation, it was found that fluctuations in the Ni composition were 1.1 times or more. It is clear that even in the α-(Fe,Ni) phase region, there is α-(Fe,Ni) phase that is a first phase and a phase that can be distinguished based on Ni content, that is, an α-(Fe,Ni) phase having a Ni content of 1.1 times or more and $10^5$ times or less the total of the Fe and Ni contained in the first phase, and a Ni content of 2 atom % or more and 100 atom % or less (this "Ni content of 2 atom % or more and 100 atom % or less" is the content (atomic percentage) in the α-(Fe,Ni) phase that is distinguishable from the first phase) is also present, namely, that regarding the α-(Fe,Ni) phases, a phase other than the first phase and that corresponds to the second phase is also present.

The density of this solid magnetic material was 5.95 g/cm³. The saturation magnetization and coercive force obtained by the direct current magnetization measurement apparatus were 0.681 T and 372.3 A/m, and there was no inflection point on the ¼ major loop. Further, the electrical resistivity of this solid magnetic material was 6.9 μΩm.

From this example, it can be seen that the solid magnetic material of the present invention has an electric resistivity, which is a characteristic of the present invention, that is higher than 1.5 μΩm and compared with the 0.1 μΩm of pure iron and the 0.5 μΩm of an electromagnetic steel sheet, for example, which are existing materials, an electric resistivity higher by one order of magnitude.

In view of the results of Examples 1 to 34, 36, and 37, and Comparative Examples 1 to 4, the electric resistivity of the present magnetic powder can be estimated as being 1.5 μΩm or more, which is higher than that of existing general metal-based magnetic materials, and therefore it was found that the present magnetic powder can solve problems such as eddy current loss.

Incidentally, based on the observation results from FE-SEM/EDX, which is suitable for finding the presence and extent of disproportionation in the Examples, it was found that the first phase and the second phase in the present magnetic powder of Examples 1 to 38 were not derived respectively from the main raw material phase and the auxiliary raw material phase of the raw material ferrite powder, but were phases that separated in the disproportionation reaction caused by the reduction reaction of the homogeneous raw material ferrite phase.

INDUSTRIAL APPLICABILITY

According to the magnetic material of the present invention, it is possible to have a high magnetization and solve the problem of eddy current loss due to a high electric resistivity, which are contradictory characteristics for conventional magnetic materials, and yet have excellent electromagnetic properties that combine the merits of both metallic magnetic materials and oxide-based magnetic materials which do not require complicated steps such as lamination, as well as have stable magnetic properties even in air.

The present invention can be utilized for a soft magnetic material used in transformers, heads, inductors, reactors, cores (magnetic core), yokes, magnet switches, choke coils, noise filters, ballast, and the like mainly used for power devices, transformers, and information communication related devices, as well as a motor or a linear motor for a rotary machines such as various actuators, voice coil motors, induction motors, reactance motors and the like, and in particular, a soft magnetic material used for a rotor, a stator, and the like, for automotive drive motors exceeding 400 rpm, motors for industrial machines such as power generators, machine tools, various generators, and various pumps, and motors for domestic electric appliances such as air conditioners, refrigerators, and vacuum cleaners.

The present invention can also be utilized for a soft magnetic material used in antennas, microwave elements, magnetostrictive elements, magnetic acoustic elements, and the like, as well as in sensors that employ a magnetic field, such as Hall elements, magnetic sensors, current sensors, rotation sensors, and electronic compasses.

In addition, the present invention can be utilized for a semi-hard magnetic material used in relays such as monostable and bistable electromagnetic relays, switches such as torque limiters, relay switches, and solenoid valves, rotating machines such as hysteresis motors, hysteresis coupling having a brake functions and the like, sensors for detecting a magnetic field, a rotation speed, and the like, a bias of a magnetic tag, a spin valve element, and the like, a magnetic recording medium or element such as a tape recorder, a VTR, a hard disk, and the like.

Further, the present invention can also be utilized for high frequency soft magnetic and semi-hard magnetic materials for high frequency transformers and reactors, as well as magnetic materials suppressing obstacles due to unnecessary electromagnetic interference, such as electromagnetic noise absorbing materials, electromagnetic wave absorbing materials, and magnetic shielding materials, materials for inductor elements such as noise removing inductors, RFID (Radio Frequency Identification) tag materials, noise filter materials, and the like.

The invention claimed is:

1. A soft magnetic or semi-hard magnetic material, comprising:
a first phase having crystals with a bcc structure containing Fe and Ni; and
a second phase having crystals with a bcc structure containing Ni,
wherein the Ni content relative to a total content of Fe and Ni contained in the second phase is an amount of 1.1 times or more and $10^5$ times or less larger than the Ni content relative to a total content of the Fe and the Ni contained in the first phase and/or is 2 atom % or more and 100 atom % or less, and
wherein when the Ni content of the first phase is taken to be 100 atom %, 0.001 atom % or more and less than 50 atom % of the Ni is substituted with one or more of Co, Zr, Hf, Ti, V, Nb, Ta, Cr, Mo, W, Mn, Cu, Zn, and Si, and
the soft magnetic or semi-hard magnetic material has a powder form and an average powder particle diameter of 10 nm or more and 5 mm or less.

2. The magnetic material according to claim 1, which is soft magnetic.

3. The magnetic material according to claim 1, wherein the second phase comprises a Ni-ferrite phase.

4. The magnetic material according to claim 1, wherein the second phase comprises a wustite phase.

5. The magnetic material according to claim 1, wherein the first phase or the first and second phases having crystals with a bcc structure containing Fe and Ni have a volume fraction of 5% by volume or more based on the whole magnetic material.

6. The magnetic material according to claim 3, comprising 20 atom % or more and 99.998 atom % or less of Fe, 0.001 atom % or more and 50 atom % or less of Ni, and 0.001 atom % or more and 55 atom % or less of O based on the composition of the whole magnetic material.

7. The magnetic material according to claim 1, wherein an average crystal grain size of the first phase, the second phase, or the whole magnetic material is 1 nm or more and less than 10 μm.

8. The magnetic material according to claim 1, wherein at least the first phase has a bcc phase having a composition represented by a composition formula $Fe_{100-x}Ni_x$ (where x is 0.001≤x≤30 in terms of atomic percentage), and the bcc phase has a crystallite size of 1 nm or more and less than 100 nm.

9. The magnetic material according to claim 1, wherein at least one of the first phase and the second phase is ferromagnetically coupled with an adjacent phase.

10. The magnetic material according to claim 1, wherein the first phase and the second phase are continuously bonded to each other directly or via a metal phase or an inorganic phase to form a massive state as the whole magnetic material.

11. A method for producing the magnetic material according to claim 1, the method comprising reducing a nickel ferrite powder having an average powder particle diameter of 1 nm or more and less than 1 μm in a reducing gas containing hydrogen gas at a reduction temperature of 450° C. or more and 1425° C. or less.

12. A method for producing the magnetic material according to claim 1, the method comprising reducing a nickel ferrite powder having an average powder particle diameter of 1 nm or more and less than 1 μm in a reducing gas containing hydrogen gas, and forming the first phase and the second phase by a disproportionation reaction.

13. The method according to claim 11, the method further comprising sintering the reduced nickel ferrite powder, wherein, in the magnetic material, the first phase and the second phase are continuously bonded to each other directly or via a metal phase or an inorganic phase to form a massive state as the whole magnetic material.

14. The method according to claim 13, the method further comprising performing annealing at least once.

15. The method according to claim 11, the method further comprising performing annealing at least once after the reduction step.

16. The method according to claim 12, the method further comprising performing annealing at least once after the reduction step or the formation step.

* * * * *